(12) United States Patent
Kreischer et al.

(10) Patent No.: US 9,375,708 B2
(45) Date of Patent: Jun. 28, 2016

(54) COMPOSITIONS AND CATALYST SYSTEMS OF METAL PRECURSORS AND OLEFINIC DILUENTS

(75) Inventors: Bruce E Kreischer, Kingwood, TX (US); Ronald D Knudsen, Bartlesville, OK (US); Orson L Sydora, Houston, TX (US)

(73) Assignee: Chevron Phillips Chemical Company LP, The Woodlands, TX (US)

(*) Notice: Subject to any disclaimer, the term of this patent is extended or adjusted under 35 U.S.C. 154(b) by 1571 days.

(21) Appl. No.: 12/609,189

(22) Filed: Oct. 30, 2009

(65) Prior Publication Data

US 2010/0113257 A1    May 6, 2010

Related U.S. Application Data (60) Provisional application No. 61/110,396, filed on Oct. 31, 2008, provisional application No. 61/110,407, filed on Oct. 31, 2008, provisional application No. 61/110,476, filed on Oct. 31, 2008.

(51) Int. Cl.
*B01J 31/12* (2006.01)
*B01J 31/02* (2006.01)
*B01J 31/14* (2006.01)

(52) U.S. Cl.
CPC ............ *B01J 31/122* (2013.01); *B01J 31/0237* (2013.01); *B01J 31/0239* (2013.01); *B01J 31/0244* (2013.01); *B01J 31/143* (2013.01); *B01J 2231/20* (2013.01); *B01J 2531/62* (2013.01); *Y02P 20/582* (2015.11); *Y10S 585/903* (2013.01)

(58) Field of Classification Search
None
See application file for complete search history.

(56) References Cited

U.S. PATENT DOCUMENTS

| 5,243,114 A | 9/1993 | Johnson et al. |
| 5,543,375 A | 8/1996 | Lashier et al. |
| 5,763,723 A | 6/1998 | Reagen et al. |
| 5,856,257 A | 1/1999 | Freeman et al. |
| 6,133,495 A * | 10/2000 | Urata et al. ............ 585/513 |
| 6,455,648 B1 | 9/2002 | Freeman et al. |
| 2001/0053742 A1 | 12/2001 | Knudsen et al. |

FOREIGN PATENT DOCUMENTS

| EP | 0608447 A1 | 1/1993 |
| WO | WO 00/34211 A | 6/2000 |

OTHER PUBLICATIONS

International Search Report and Written Opinion, PCT/US2009/062681, Jan. 27, 2010, 12 pages.
Yang Y et al., "Roles of Chloro compound in homogenous [Cr(2-ethylhexanoate)3/2,5-dimethylpyrrole/triethylaluminum/chloro compound] catalyst system for ethylene trimerization", Applied Catalysis, vol. 193, No. 1-2, Feb. 28, 2000, pp. 29-38.

* cited by examiner

*Primary Examiner* — Melvin C Mayes
*Assistant Examiner* — Colette Nguyen
(74) *Attorney, Agent, or Firm* — Fletcher Yoder, P.C.

(57) ABSTRACT

A system and method for preparing and using a metal precursor diluent composition are described. The composition includes a metal precursor, and about 18% to about 80% by weight of an olefinic diluent having between 6 and 18 carbon atoms. Such compositions may be used in oligomerization catalyst systems.

27 Claims, 4 Drawing Sheets

FIG. 7

COMPOSITIONS AND CATALYST SYSTEMS OF METAL PRECURSORS AND OLEFINIC DILUENTS

CROSS REFERENCE TO RELATED APPLICATIONS

This application claims priority to U.S. Provisional Patent Application No. 61/110,396 filed Oct. 31, 2008, U.S. Provisional Patent Application No. 61/110,407, filed Oct. 31, 2008, and U.S. Provisional Patent Application No. 61/110,476, filed Oct. 31, 2008. Each of these provisional patent applications is hereby incorporated by reference in its entirety.

BACKGROUND

The present invention relates generally to oligomerization catalyst systems and, more specifically, to providing a metal precursor in an olefin diluent for oligomerization catalyst systems.

This section is intended to introduce the reader to aspects of art that may be related to aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As chemical and petrochemical technologies have advanced, the products of these technologies have become increasingly prevalent in society. In particular, as techniques for bonding simple molecular building blocks into longer chains have advanced, the products (i.e., alpha olefins, oligomers, polymers, etc.) have been increasingly incorporated into or employed to produce various everyday items. In the production of these longer-chain molecules, upstream catalyst systems and compositions are utilized to oligomerize or polymerize monomers (e.g., ethylene, propylene, butene, etc.) into the longer-chain products (e.g., polymers, oilgomers, longer-chain olefins such as 1-hexene, and so on). These catalyst systems and their preparation can affect the efficiency of the oligomerization or polymerization, and the quality of the oligomer or polymer.

SUMMARY OF THE EMBODIMENTS

Described herein are embodiments of compositions and catalyst systems comprising such compositions. In a broad embodiment, the composition includes a metal precursor and an olefinic diluent. In some embodiments referred to herein, the metal precursor is a catalyst precursor. In certain embodiments, the metal precursor is a chromium catalyst precursor. Furthermore, the olefinic diluent may contain between 6 and 18 carbon atoms. In certain embodiments, the olefinic diluent is a liquid at 25° C. and 1 atm of pressure. In certain embodiments, the olefinic diluent is an alpha olefin.

In any of the embodiments described herein, the olefinic diluent may be present in the composition in various weight percentages. In some embodiments, the composition includes about 10% to about 95% by weight of an olefinic diluent. In some embodiments, the composition includes about 18% to about 80% by weight of an olefinic diluent. In some embodiments, the composition includes about 25% to about 55% by weight of an olefinic diluent. In some embodiments, the composition includes about 35% to about 50% by weight of an olefinic diluent. In some embodiments, the composition includes about 30% to about 45% by weight of an olefinic diluent. In some embodiments, the composition includes about 30% to about 35% by weight of an olefinic diluent.

In some embodiments, the metal precursor (e.g., the chromium catalyst precursor) and the olefinic diluent may be mixed in various weight ratios. In some embodiments, the weight ratio of diluent to the metal atom in the precursor ranges from 13:1 to 44:1. In some embodiments, the weight ratio of the diluent to the metal atom ranges from 16:1 to 28:1. In some embodiments, the weight ratio of the diluent to the metal atom ranges from 18:1 to 25:1. In some embodiments, the weight ratio of the diluent to the metal atom ranges from 20:1 to 30:1. In some embodiments, the weight ratio of the diluent to the metal atom ranges from 22:1 to 24:1.

In some embodiments, the composition is inert and components of the composition will not substantially react with any other components of the composition under ambient conditions (25° C. and 1 atm of air). In some embodiments, the composition does not comprise an activator or cocatalyst. However, the composition may contain other components such as a nitrogen containing compound.

In any of the foregoing embodiments, the metal precursor may be a chromium catalyst precursor. In some embodiments, the chromium catalyst precursor is an olefin oligomerization catalyst precursor. In some embodiments, the chromium catalyst precursor is a chromium (II) or chromium (III) organometallic compound. In some embodiments, the chromium catalyst precursor is a chromium (II) or chromium (III) acetonate. In some embodiments, the chromium catalyst precursor is a chromium (II) or chromium (III) carboxylate. Specific examples of these compounds, such as chromium (III)2-ethylhexanoate, are further described herein.

As noted above, in some embodiments, the olefinic diluent is an alpha olefin. In some embodiments, the olefinic diluent is selected from the group consisting of 1-decene, 1-dodecene, 1-tetradecene, and mixtures thereof. In some embodiments, the olefinic diluent is 1-decene. In some embodiments, the olefinic diluent is 1-dodecene.

In any of the herein described embodiments, the composition containing the metal precursor and the olefinic diluent may be used as a component in a catalyst system. In some embodiments, a catalyst system includes a composition comprising a chromium catalyst precursor and an olefinic diluent. Additionally, the catalyst system may include a cocatalyst. Additionally, the catalyst system may include an activator. For example, a catalyst system may include the composition comprising a chromium catalyst precursor, an olefinic diluent, and a metal alkyl. Such catalyst systems may additionally comprise a nitrogen containing compounds such as a pyrrole. Furthermore, the catalyst system may include one or more components additionally described herein.

BRIEF DESCRIPTION OF THE DRAWINGS

Advantages of the invention may become apparent upon reading the following detailed description and upon reference to the drawings in which.

DETAILED DESCRIPTION OF EMBODIMENTS

One or more specific embodiments of the present techniques will be described herein. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

For any particular compound disclosed herein, the general structure presented is intended to encompass all structural isomers, conformational isomers, and stereoisomers that may arise from a particular set of substituents, unless indicated otherwise. Thus, a general reference to a compound includes all structural isomers unless explicitly indicated otherwise; e.g. a general reference to butane include n-pentane, 2-methyl-butane, and 2,2-dimethylpropane. Additionally, the reference to a general structure encompasses all enantiomers, diastereomers, and other optical isomers whether in enantiomeric or racemic forms, as well as mixtures of stereoisomers, as the context permits or requires. For any particular formula that is presented, any general formula presented also encompasses all conformational isomers, regioisomers, and stereoisomers that may arise from a particular set of substituents.

Regarding claim transitional terms or phrases, the transitional term "comprising", which is synonymous with "including," "containing," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Absent an indication to the contrary, when describing a compound or composition "consisting essentially of" is not to be construed as "comprising," but is intended to describe the recited component that includes materials which do not significantly alter composition or method to which the term is applied. For example, a feedstock consisting of a material A can include impurities typically present in a commercially produced or commercially available sample of the recited compound or composition. When a claim includes different features and/or feature classes (for example, a method step, feedstock features, and/or product features, among other possibilities), the transitional terms comprising, consisting essentially of, and consisting of apply only to feature class to which is utilized and it is possible to have different transitional terms or phrases utilized with different features within a claim. For example a method can comprises several recited steps (and other non-recited steps) but utilize a catalyst system preparation consisting of specific or alternatively consist of specific steps but utilize a catalyst system comprising recited components and other non-recited components.

While compositions and methods are described in terms of "comprising" various components or steps, the compositions and methods can also "consist essentially of" or "consist of" the various components or steps.

The terms "a," "an," and "the" are intended, unless specifically indicated otherwise, to include plural alternatives, e.g., at least one. For instance, the disclosure of "a metallocene" is meant to encompass one metallocene, or mixtures or combinations of more than one metallocene unless otherwise specified.

The term "alpha olefin" as used in this specification and claims refers to an olefin that has a double bond between the first and second carbon atom of the longest contiguous chain of carbon atoms. The term "alpha olefin" includes linear and branched alpha olefins unless expressly stated otherwise. In the case of branched alpha olefins, a branch may be at the 2-position (a vinylidene) and/or the 3-position or higher with respect to the olefin double bond. The term "vinylidene" whenever used in this specification and claims refers to an alpha olefin having a branch at the 2-position with respect to the olefin double bond. By itself, the term "alpha olefin" does not indicate the presence or absence of heteroatoms and/or the presence or absence of other carbon-carbon double bonds unless explicitly indicated. The terms "hydrocarbon alpha olefin" or "alpha olefin hydrocarbon" refer to alpha olefin compounds containing only hydrogen and carbon.

The term "linear alpha olefin" as used herein refers to a linear olefin having a double bond between the first and second carbon atom. The term "linear alpha olefin" by itself does not indicate the presence or absence of heteroatoms and/or the presence or absence of other carbon-carbon double bonds, unless explicitly indicated. The terms "linear hydrocarbon alpha olefin" or "linear alpha olefin hydrocarbon" refers to linear alpha olefin compounds containing only hydrogen and carbon.

The term "normal alpha olefin" whenever used in this specification and claims refers to a linear hydrocarbon monoolefin having a double bond between the first and second carbon atom. It is noted that "normal alpha olefin" is not synonymous with "linear alpha olefin" as the term "linear alpha olefin" can include linear olefinic compounds having a double bond between the first and second carbon atoms and having heteroatoms and/or additional double bonds.

The term "consists essentially of normal alpha olefin(s)," or variations thereof, whenever used in this specification and claims refers to commercially available normal alpha olefin product(s). The commercially available normal alpha olefin product can contain non-normal alpha olefin impurities such as vinylidenes, internal olefins, branched alpha olefins, paraffins, and diolefins, among other impurities, which are not removed during the normal alpha olefin production process. One of ordinary skill in the art will recognize that the identity and quantity of the specific impurities present in the commercial normal alpha olefin product will depend upon the source of commercial normal alpha olefin product. Consequently, the term "consists essentially of normal alpha olefins" and its variants is not intended to limit the amount/quantity of the non-linear alpha olefin components any more stringently than the amounts/quantities present in a particular commercial normal alpha olefin product unless explicitly stated. One source of commercially available alpha olefins products are those produced by the oligomerization of ethylene. A second source of commercially available alpha olefin products are those which are produced, and optionally isolated from, Fischer-Tropsch synthesis streams. One source of commercially available normal alpha olefin products produced by ethylene oligomerization which may be utilized as an olefin feedstock is Chevron Phillips Chemical Company LP, The Woodlands, Tex., USA. Other sources of commercially available normal alpha olefin products produced by ethylene oligomerization which may be utilized as an olefin feedstock include Inneos Oligomers (Feluy, Belgium), Shell Chemicals Corporation (Houston, Tex., USA or London, United Kingdom), Idemitsu Kosan (Tokyo, Japan), and Mitsubishi Chemical Corporation (Tokyo, Japan), among others. One source of commercially available normal alpha olefin products produced, and optionally isolated from Fisher-Tropsch synthesis streams includes Sasol (Johannesburg, South Africa), among others.

The present techniques relate to more efficient methods for forming, handling, storing, shipping, and/or processing a metal precursor to be used in a catalyst system. In some embodiments, the catalyst system is an oligomerization or polymerization catalyst system. In one embodiment, the precursor (e.g., metal precursor or catalyst precursor) may be utilized to form a catalyst system for an alpha olefin manufacturing process or other process. In certain examples, the catalyst system may be employed in a reactor to oligomerize a monomer, such as ethylene or other monomers, to produce an alpha olefin, such as 1-hexene or larger alpha olefins. The produced alpha olefin may be subsequently transported and sold to a customer, or may be used on-site as a feedstock for other processes, such as fed as a co-monomer in a polyolefin polymerization. The techniques discussed herein may improve the preparation, storage, transportation, handling, and/or processing of the metal precursor and subsequent oligomerization catalyst system.

A catalyst system for the oligomerization of an olefin (e.g., ethylene, butene, 1-hexene, etc.) to an oligomer (e.g., 1-hexene, 1-octene, decene, dodecene, etc.) may be formed from a metal precursor (e.g., chromium (III) tris(2-ethylhexanoate) diluted in one or more certain olefinic diluents. As used herein, "olefin" or "olefinic" means or describes an acyclic or cyclic hydrocarbon group having one or more carbon-carbon double bonds, and does not include double bonds which are part of an aromatic group. As referred to herein, "olefinic diluents" may also mean a single olefin compound (as defined in any embodiment herein) used as a diluents or may mean two or more olefin compounds (as defined in any embodiment herein) mixed to form a mixed diluent.

An olefinic diluent may beneficially be used for diluting the metal precursor to form the metal precursor solution, suspension, or emulsion. In selecting the olefinic diluent, one or more criteria may be used, including, but not limited to, one or more of the following: the flash point of the olefinic diluent, the inert nature of the diluent under certain conditions as related to the catalytic process in which the metal precursor is used, the ability of the diluent to cause the metal precursor to be fluid-like and moveable at certain temperatures and pressures, and/or the ability of the diluent to present certain processing advantages in subsequent catalytic processes (e.g., the oligomerization or polymerization processes further described herein). For example, it may be advantageous to select an olefinic diluent that does not react with the metal precursor at standard storage and transportation temperatures, but provides for a stable solution of metal precursor and solvent that may be stored (e.g., about 3 months, about 6 months, about 12 months, about 18 months, or longer) or shipped over long distances to a facility that further prepares and/or uses the metal precursor/diluents composition.

In one embodiment, the olefinic diluent is selected to have a certain flash point. In some embodiments, an olefinic diluent has a flash point greater than about 35° C. or higher. In other embodiments, an olefinic diluent has a flash point greater than about 45° C. or higher. In other embodiments, an olefinic diluent has a flash point greater than about 55° C. or higher. In other embodiments, an olefinic diluent has a flash point greater than about 60° C. or higher. In other embodiments, an olefinic diluent has a flash point greater than about 65° C. or higher. In other embodiments, an olefinic diluent has a flash point ranging between about 45° C. and about 250° C. In other embodiments, an olefinic diluent has a flash point ranging between about 55° C. and about 225° C. In other embodiments, an olefinic diluent has a flash point ranging between about 60° C. and about 200° C. In other embodiments, an olefinic diluent has a flash point ranging between about 65° C. and about 175° C. In other embodiments, an olefinic diluent has a flash point ranging between about 45° C. and about 120° C. In other embodiments, an olefinic diluent has a flash point ranging between about 55° C. and about 95° C.

In certain embodiments, the olefinic diluent may be a $C_6$ to $C_{20}$ olefin, or a $C_8$ to $C_{16}$ olefin. In of the foregoing embodiments, the olefinic diluent may be a linear or branched olefin. In some embodiments, the olefin diluent is branched at the β-carbon. In other embodiments, the olefin diluents is branched on a non-β carbon. In some embodiments, the olefinic diluent may be cyclic or acyclic. In some embodiments, the olefinic diluent has a carbon-carbon double bond that is in the alpha position. In some embodiments, the olefinic diluent has a carbon-carbon double bond that is in a non-alpha position. In some embodiments, the olefinic diluent has two or more carbon-carbon double bonds, having one such bond in the alpha position.

In any of the foregoing embodiments, the olefin diluents may comprise an alpha olefin. In some embodiments, the alpha olefin is a normal alpha olefin. In some embodiments, the organic diluent comprises, or consists essentially of, a $C_6$ to $C_{18}$ normal alpha olefin. In some embodiments, the organic diluent comprises, or consists essentially of, a $C_8$ to $C_{16}$ normal alpha olefin. In some embodiments, the organic diluent comprises, or consists essentially of, a $C_{10}$ to $C_{14}$ normal alpha olefin. In some embodiments, the normal alpha olefin is selected from the group consisting of 1-hexene, 1-octene, 1-decene, 1-dodecene, 1-tetradecene, 1-hexadecane, octadecene, or combinations thereof. In some embodiments, the normal alpha olefin is selected from the group consisting of 1-decene, 1-dodecene, 1-tetradecene, or combinations thereof. In some embodiments, the normal alpha olefin is 1-decene. In other embodiments, the normal alpha olefin is 1-dodecene. In other embodiments, the normal alpha olefin is 1-tetradecene.

Advantageously, in certain embodiments, an alpha olefin diluent may not require further purification to be used as a diluent beyond the purification generally used in manufacturing of the product alpha olefin. Advantageously, in certain embodiments, the olefinic diluent does not react with the metal precursor at standard storage and transportation temperatures, but provides for a stable solution of metal precursor and diluent that may be stored. For example, the metal precursor and diluents may form a composition that has stability at for about 3 months, alternatively about 6 months, alternatively about 12 months, or alternatively about 18 months with no detectable decomposition. In addition, the composition may be shipped over long distances to a facility that prepares and uses the composition.

Various methods may be employed to form the composition containing the metal precursor and the olefinic diluent. In some embodiments, the metal precursor and the olefinic diluents are contacted to form the composition. In other embodiments, the metal precursor is precontacted with a solvent prior to contacting it with the olefinic diluent. In some embodiments, the metal precursor may be contacted with a portion of the olefinic diluent and then mixed with the same or a different olefinic diluent. In further embodiments, the metal precursor may be activated as a catalyst and then added to feedstock prior to or after contacting the olefinic diluent.

In some embodiments, the metal precursor and the olefinic diluent are mixed in various ratios. In one embodiment, the composition comprises from about 18% to 80% by weight of the olefinic diluent. In another embodiment, the composition comprises from about 25% to 55%, by weight of the olefinic diluent. In another embodiment, the composition comprises from about 32% to 62%, by weight of the olefinic diluent. In another embodiment, the composition comprises from about 20% to 70%, by weight of the olefinic diluent. In another embodiment, the composition comprises from about 25% to 45%, by weight of the olefinic diluent.

In some embodiments, the weight ratio of the olefinic diluent to the metal atom of the metal precursor ranges from 13:1 to 44:1. In some embodiments, the weight ratio of the olefinic diluent to the metal atom of the metal precursor ranges from 18:1 to 20:1. In some embodiments, the weight ratio of the olefinic diluent to the metal atom of the metal precursor ranges from 17:1 to 34:1. In some embodiments, the weight ratio of the olefinic diluent to the metal atom of the metal precursor ranges from 24:1 to 55:1. In some embodiments, the weight ratio of the olefinic diluent to the metal atom of the metal precursor ranges from 30:1 to 40:1.

In some embodiments, the composition containing the metal precursor and the olefinic diluent is a solution, suspension, or emulsion. In some of these embodiments, it may be desired that the composition has a viscosity within a certain range. In some embodiments, the composition has a viscosity between about 150 and 300 cSt at 20° C. In some embodiments, the composition has a viscosity between about 200 and 250 cSt at 20° C. In some embodiments, the composition has a viscosity between about 160 and 240 cSt at 20° C. In some embodiments, the composition has a viscosity between about 180 and 260 cSt at 20° C. In some embodiments, the composition has a viscosity between about 170 and 230 cSt at 20° C.

The metal precursor may be diluted on-site at the facility that forms and/or employs the catalyst system, such as at an alpha olefin manufacturing facility, or the metal precursor may be previously diluted, and stored and shipped as a solution of metal precursor and diluent or solvent. As noted below, in certain embodiments, the ultimate catalyst system may be an oligomerization catalyst system used to oligomerize or trimerize an olefin (e.g., ethylene) into a product (e.g., 1-hexene).

The term "oligomerization" and its derivatives refer to processes which produce a mixture of products containing at least 70 weight percent products containing from 2 to 30 monomer units. Similarly, an "oligomer" is a product that contains from 2 to 30 monomer units while an "oligomerization product" includes all product made by the "oligomerization" process including the "oligomers" and products which are not "oligomers" (e.g. product which contain more than 30 monomer units). It should be noted that the monomer units in the "oligomer" or "oligomerization product" do not have to be the same. For example, an "oligomer" or "oligomerization product" of an "oligomerization" process using ethylene and propylene as monomers may contain both ethylene and/or propylene units.

The term "trimerization," and it derivatives, refer to a processes which produce a mixture of products containing at least 70 weight percent products containing three and only three monomer units. A "trimer" is a product which contains three and only three monomer units while a "trimerization product" includes all products made by the trimerization process including "trimer" and products which are not "trimer" (e.g. dimers or tetramers). Generally, an olefin trimerization reduces number of olefinic bonds, i.e., carbon-carbon double bonds, by two when considering the number of olefin bonds in the monmer units and the number of olefin bonds in the trimer. It should be noted that the monomer units in the "trimer" or "trimerization product" do not have be the same. For example, a "trimer" of a "trimerization" process using ethylene and butene as monomers may contain ethylene and/or butene monomer units. That is to say the "trimer" will include $C_6$, $C_8$, $C_{10}$, and $C_{12}$ products. In another example, a "trimer" of a "trimerization" process using ethylene as the monomer contain ethylene monomer units. It should also be noted that a single molecule may contain two monomer units. For example dienes, such as 1,3-butadiene and 1,4-pentadiene, have two monomer units within one molecule.

Process Overview

Figure 1:
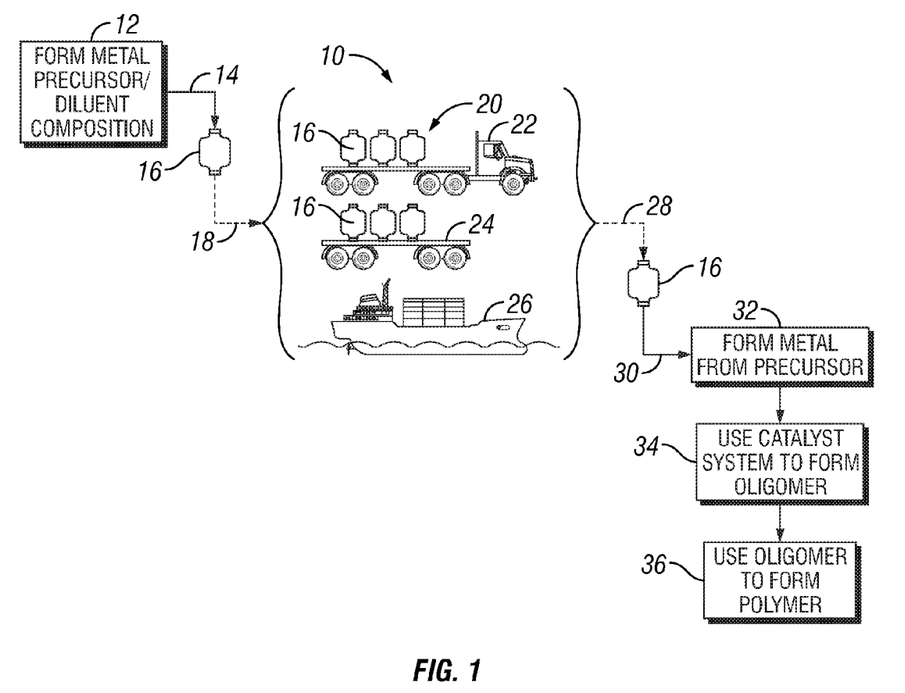
FIG. 1 is a flow chart of handling and using an oligomerization metal precursor in accordance with embodiments of the present techniques.

Turning now to the drawings, FIG. 1 depicts an exemplary process 10 for preparing, storing, shipping, and using a metal precursor-diluent composition for an oligomerization catalyst system. The metal precursor-diluent composition may be formed (block 12) by mixing a metal precursor (e.g., chromium (III) ethyl hexanoate) and an olefinic diluent (e.g., an olefin solvent or alpha olefin solvent). The composition may then be loaded, for example, through a loading line 14, into a storing or shipping container 16 to be stored or moved to another location. The storage or shipping container 16 may generally be configured to store or ship the composition. The configuration of the container 16 may include reinforced walls, pressure relief systems, and other systems that may be used for the storage or shipment of hydrocarbon solutions. In certain embodiments, such containers 16 may meet standards set by the U.S. Department of Transportation, the International Standards Organization, or other quasi-governmental or governmental regulatory bodies. However, it should be emphasized that the present techniques are not limited to satisfying any particular standard or regulation.

The storage or shipping container 16 may be loaded (as indicated by reference numeral 18), by itself or with other containers 16, onto a transportation vehicle 20 to be moved to another location. The transportation vehicle 20 may include any number of vehicles capable of moving the container 16 between locations. For example, the transportation vehicle 20 may include a truck 22, a railcar 24, a ship 26, or any number of smaller transportation vessels 20, such as a fork lift (not shown) or a crane (not shown). After the transportation vehicle 20 arrives at it destination, the container 16 may be removed from the transportation vehicle 20 and loaded onto a new transportation vehicle 20 to be moved to another location, or the container 16 may be offloaded (as indicated by reference numeral 28) at a process site. At the process site the container 16 may be coupled (as indicated by reference numeral 28) to the catalyst system preparation process or an oligomerization process, to remove the composition from the storage or shipping container 16 for use in preparing a catalyst system. For instance, after the shipping container 16 is unloaded at the process through line 30, composition may be used to form an oligomerization catalyst system. For applicable examples of metal precursors and oligomerization catalyst systems, and their exemplary preparation, see U.S. Pat. No. 6,133,495 and U.S. Pat. No. 7,384,886, both of which are incorporated herein by reference in their entirety for all purposes. It should also be noted that the oligomerization catalyst system may be prepared separately and feed to the oligomerization reactor, or alternatively, the catalyst system may be formed in the reactor by contacting at least one catalyst system component in the reactor in the presence of the olefin feedstock.

The metal precursor-diluent composition may be used to form an oligomerization catalyst system (block 32). The oligomerization catalyst system may be used in further processes (block 34) to form an alpha olefin oligomer, such as a trimer (e.g., 1-hexene). For a discussion of for the use of catalyst system and associated exemplary oligomerization processes, such as exemplary trimerization processes, see U.S. Pat. No. 7,384,886, U.S. Patent Application Publication No. 2002/0182124, and U.S. Patent Application Publication No. 2004/0236163, all three of which are incorporated herein by reference in their entirety for all purposes. Lastly, the produced alpha olefin oligomer (e.g., 1-hexene, 1-octene, 1-decene, etc.) may be transported off-site as a final product or may be an intermediate and used as a feedstock, such as used as a comonomer in a downstream polyolefin process (block 36).

Metal Precursor Solution

Figure 2:
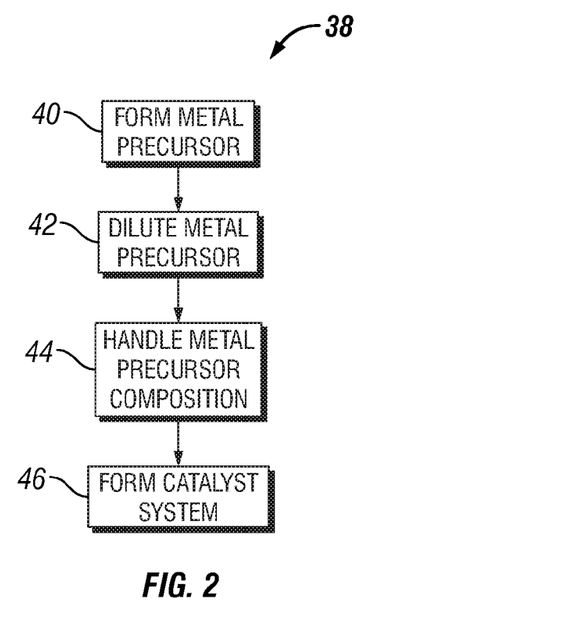
FIG. 2 is a block diagram of method for preparing a metal precursor solution and subsequent catalyst composition in accordance with embodiments of the present techniques.

A process 38 for forming a metal precursor solution is illustrated in greater detail in FIG. 2. The process may begin with the formation or purchase of a metal precursor (block 38). The metal precursor may include chromium, nickel, cobalt, iron, molybdenum, or copper, or compounds of these metals; alternatively, chromium compounds. Chromium compounds that may be used as the metal precursor include organic or inorganic compounds in which the chromium oxidation state is from 0 to 6. Generally, the chromium source will have a formula of $CrX_n$, in which each X may be the same or different and may be any organic or inorganic radical, and n may be an integer from 1 to 6. Organic radicals that may be used for X may have from about 1 to about 20 carbon atoms per radical, and may include alkyl, alkoxy, ester, ketone, carboxylate, or amido radicals, among others. In an embodiment, the organic radicals may be a carboxylate; alternatively, an acetonate. The organic radicals may be straight-chained or branched, cyclic or acyclic, aromatic or aliphatic, and may include mixed aliphatic, aromatic, or cycloaliphatic groups. Exemplary inorganic radicals include, but are not limited to, any anion or oxidizing radical, for example, halides, sulfates, or oxides. Exemplary metal precursor include, but are not limited to, chromium compounds, such as organometallic chromium (II) or chromium (III) compounds, or a mixture thereof.

The organometallic chromium compounds which may be used as the metal precursor may be a chromium(II) carboxylate or a chromium(III) carboxylate; alternatively, a chromium(II) carboxylate; or alternatively, a chromium(III) carboxylate. Each carboxylate of the chromium(II) or chromium (III) carboxylate may be a $C_1$ to $C_{24}$, a $C_4$ to $C_{19}$, or a $C_5$ to $C_{12}$ carboxylate. In an embodiment, the carboxylate group may be an acetate, a propionate, a butyrate, a pentanoate, a hexanoate, a heptanoate, an octanoate, a nonanoate, a decanoate, an undecanoate, a dodecanoate, a tridecanoate, a tetradecanoate, a pentadecanoate, a hexadecanoate, a heptadecanoate, or an octadecanoate; or alternatively, a pentanoate, a hexanoate, a heptanoate, a octanoate, a nonanoate, a decanoate, a undecanoate, or a dodecanoate. In some embodiments, the carboxylate group may be acetate, propionate, n-butyrate, valerate (n-pentanoate), neo-pentanoate, capronate (n-hexanoate), n-heptanoate, caprylate (n-octanoate), 2-ethylhexanoate, n-nonanoate, caprate (n-decanoate), n-undecanoate, laurate (n-dodecanoate), or stearate (n-octadecanoate); alternatively, valerate (n-pentanoate), neo-pentanoate, capronate (n-hexanoate), n-heptanoate, caprylate (n-octanoate), 2-ethylhexanoate, n-nonanoate, caprate (n-decanoate), n-undecanoate, or laurate (n-dodecanoate); alternatively, capronate (n-hexanoate)); alternatively, n-heptanoate); alternatively, caprylate (n-octanoate)); or alternatively, 2-ethylhexanoate. Exemplary chromium(II) carboxylates may include, but are not limited to, chromium(II) acetate, chromium(II) propionate, chromium(II) butyrate, chromium(II) neopentanoate, chromium(II) oxalate, chromium(II) octanoate, chromium(II) (2-ethylhexanoate), chromium(II) laurate, or chromium(II) stearate. Exemplary chromium(III) carboxylates may include, but are not limited to, chromium (III) acetate, chromium(III) propionate, chromium(III) butyrate, chromium(III) neopentanoate, chromium(III) oxalate, chromium(III) octanoate, chromium (III)2-ethylhexanoate, chromium(III)2,2,6,6,-tetramethylheptanedionate, chromium(III) naphthenate, chromium(III) laurate, or chromium(III) stearate. In an embodiment, the organometallic chromium compound which may be used as the metal precursor is chromium(II)2-ethylhexanoate or chromium(III)2-ethylhexanote; or alternatively chromium(III)2-ethylhexanoate. Excess reactants and by-products may be removed (block 42) from the reacted precursor by any number of techniques known in the art. Such techniques may include vacuum stripping, filtering, solvent washing, or any number of other techniques.

The metal precursor (e.g., a solid, liquid, or paste) may be diluted (block 42) to form a metal precursor-diluent composition. Suitable olefinic diluents are described herein. Exemplary alpha olefin solvents include, but are not limited to, 1-hexene, 1-octene, 1-decene, 1-dodecene, 1-tetradecene, 1-hexadecene, or 1-octadecene, or combinations thereof, among others. In an embodiment, the alpha olefin diluent may be 1-decene, 1-dodecene, 1-tetradecene, or any combination thereof; alternatively, 1-decene; alternatively, dodecene; or alternatively, tetradecene. The choice of the solvent may depend on viscosity, flashpoint, cost, availability, the ultimate catalyst composition selectivity, and so forth. The metal precursor-diluent composition is then subsequently handled, such as used on-site, stored, shipped, transported, processed, and so on, as indicated by reference numeral 44 in FIG. 2. The dilution of the metal precursor with an olefinic diluent into the composition may facilitate handling of the metal precursor.

Advantageously, the use of an alpha olefin diluent, such as 1-dodecene, as a solvent for the metal precursor, may increase the selectivity of a subsequent oligomerization reaction (e.g., to form 1-hexene. 1-octene. etc.), increasing the yield of the oligomer (e.g., 1-hexene) by as much as 1% with use of 1-dodecene as a solvent in the metal precursor solution as compared to use of ethylbenzene as a solvent in the metal precursor solution. Further, if the metal precursor solution has a viscosity of less than about 300 centistokes at about 20° C., handling and pumping the solution within a given site is facilitated. In certain embodiments, a desired viscosity (any of those noted above) may be obtained for a chromium precursor (e.g., paste) by diluting the chromium precursor until the chromium concentration, by weight, is between about 5% and about 10% in the solution; alternatively, between about 5.5% and about 9% in the solution; alternatively, between about 6% and about 8%; or alternatively, between about 6.30 wt % and about 7.25 wt % in the solution. After dilution, the metal or chromium precursor solution may be loaded into a shipping container 16 to be moved to another location for use. As noted herein, a higher flash point solvent may be easier to handle in a chemical plant environment. Generally, a flash point of 35° C., or higher, may be beneficial. In some embodiments, the flash points of the olefinic diluents are any of those noted herein. Such a flash point may be achieved through the use of 1-decene, which has a flash point of about 47° C., 1-dodecene, which has a flash point of about 77° C., or other alpha olefins or blends of alpha olefins.

Catalyst System

In some embodiments, the metal precursor-diluent composition (e.g., solution) may be reacted and/or mixed (block 46 in FIG. 2) with other compounds to form an oligomerization catalyst composition or components. For example, a catalyst composition or components may be formed by combining the metal precursor solution, with a metal alkyl and a nitrogen containing compound, such as a pyrrole, and so on. Typically, catalyst system component may be contacted in different orders or under alternative conditions to prepare the catalyst system compositions. For example, the metal precursor solution may be contacted with the nitrogen compound first or substantially simultaneously with the metal alkyl. Alternately contact of the precursor components can be done in the reactor.

The catalyst system preparation, including contacting the nitrogen compound, the metal alkyl, and the metal precursor solution may be performed in a unsaturated hydrocarbon solvent. In an embodiment the hydrocarbon solvent may be any alkene or hydrocarbon aromatic solvent. Typically, the catalyst preparation may be performed in an unsaturated hydrocarbon. The unsaturated hydrocarbon may be any aromatic or unsaturated aliphatic hydrocarbon and may have any number of carbon atoms per molecule. The unsaturated hydrocarbon may comprise less than about 70 carbon atoms per molecule or less than about 20 carbon atoms per molecule. The choice of the unsaturated hydrocarbon may be made on the basis of commercial availability and ease of use. Aliphatic hydrocarbon compounds that may be used as the solvent include ethylene, 1-hexene, 1,3-butadiene, and mixtures thereof, among others. An unsaturated aliphatic hydrocarbon compound that may be used in embodiments is 1-hexene. If 1-hexene is the target oligomer to be formed, this may decrease the need for subsequent purification steps. Aromatic hydrocarbons that may be used as the solvent for the catalyst system may include, but are not limited to, $C_6$ to $C_{50}$ aromatic compounds; alternatively, $C_6$ to $C_{30}$ aromatic compounds; alternatively, $C_6$ to $C_{18}$ aromatic compounds; or alternatively, $C_6$ to $C_{10}$ aromatic compounds. Exemplary aromatic hydrocarbon include, but are not limited to, toluene, benzene, ethylbenzene, xylene (ortho, meta, para, or any combination thereof), mesitylene, hexamethylbenzene, and mixtures thereof. Aromatic hydrocarbon solvents may improve catalyst system stability and assist in producing an active and selective catalyst system, as discussed further herein. In one embodiment, the unsaturated hydrocarbon may be toluene; alternatively, ethyl benzene.

The amount of aromatic compound that may be used in the preparation of the oligomerization catalyst system may be up to about 15 weight percent, based on the amount of solvent in the reactor, between about 0.001 and about 10 weight percent, or between about 0.01 and about 5 weight percent. Excess aromatic compound may inhibit catalyst system activity and insufficient aromatic compound may not stabilize the catalyst system. Generally, the moles of aromatic compound per mole of active metal precursor (e.g. chromium compound) in the catalyst system may be up to about 6,000, between about 10 and about 3,000, or between about 20 to 1,000 moles of aromatic compound per mole of active metal precursor (e.g. chromium compound) in the catalyst system.

Contacting of the aromatic compound and catalyst system may occur under any conditions sufficient to stabilize the catalyst system in the presence of heat. Generally, the temperatures for contacting may be between about −50° C. and about 70° C., between about 10° C. and about 70° C., or between about 5° C. and 30° C. Generally, contacting times may be less than about 5 hour, between about 0.01 seconds and about 4 hours, or between about 0.1 seconds and 3 hours. Longer contact times may not improve catalyst system stability, and shorter contact times may be insufficient to allow complete contacting of the aromatic compound and catalyst system and, therefore, may not be sufficient to stabilize the catalyst system. Any pressure which allows thorough contacting of the aromatic compound and catalyst system may be used. Generally, any pressure which can maintain the aromatic compound and catalyst system in liquid form may be used. The contacting may be performed under a dry, inert atmosphere to minimize altering the catalyst system. Again, however, in addition to the foregoing discussion, for other applicable examples of metal precursors and oligomerization catalyst systems, and their exemplary preparation, see attached U.S. Pat. No. 6,133,495 and attached U.S. Pat. No. 7,384,886, which are hereby incorporated by reference in their entireties for all purposes.

The temperature for the catalyst system preparation may be between about −78° C. and about 200° C., between about 0° C. and about 50° C., or between about 5° C. and about 40° C. The temperature may be controlled to decrease particle formation and increase catalyst system activity and productivity. The catalyst system preparation is generally performed under an inert atmosphere, such as nitrogen or argon, to decrease the amount of water vapor and oxygen present. Nitrogen is often used due to cost and availability.

The nitrogen-containing compounds that may be used to form the catalyst system include amines, amides, imides, nitriles, and pyrroles. For example, amines that may be used to form the catalyst system may include, but are not limited to, $C_3$ to $C_{20}$ amines; alternatively, $C_3$ to $C_{15}$ amines; or alternatively, $C_3$ to $C_{10}$, amines Applicable amines may be primary amines or secondary amines. In an embodiment, useful amines may include mono-hydrocarbylamines; or alternatively, di-hydrocarbylamines. Each hydrocarbyl group(s) of the mono- or di-hydrocarbylamines may be independently selected from a $C_1$ to $C_{10}$ alkyl group, a $C_5$-$C_{10}$ cycloalkyl group, a $C_6$-$C_{10}$ aryl group; or a $C_7$-$C_{10}$ alkylaryl group; alternatively, a $C_1$ to $C_{10}$ alkyl group; a $C_5$-$C_{10}$ cycloalkyl group; alternatively, a $C_6$-$C_{10}$ aromatic group; or alternatively, a $C_7$-$C_{10}$ alkylaryl group. Applicable alkyl group(s) for that mono- or di-hydrocarbylamines alkanes include a methyl group, an ethyl group, a propyl group, a butyl group, a pentyl group, a hexyl group, a heptyl group, an octyl group, a nonyl group, or a decyl group; alternatively, a methyl group, an ethyl group, a propyl group, a butyl group, a pentyl group; alternatively, a methyl group, an ethyl group, an n-propyl group, an isopropyl group, an n-butyl group, an iso-butyl group, a sec-butyl group, a tert-butyl group, an pentyl group, or a neopentyl group; alternatively, a methyl group; alternatively, an ethyl group; alternatively, an n-propyl group; alternatively, an isopropyl group; alternatively, an n-butyl group; alternatively, an iso-butyl group; alternatively, a sec-butyl group; alternatively, a tert-butyl group; alternatively, an pentyl group; or alternatively, a neopentyl group. Applicable cycloalkyl group (s) for the mono- or di-hydrocarbylamines include a cyclopentyl group or a cyclohexyl group; alternatively, a cyclopentyl group; or alternatively, a cyclohexyl group. Applicable aryl group(s) for the mono- or di-hydrocarbylamines include a phenyl group, a tolyl group, or a xylyl, alternatively, a phenyl group; alternatively a tolyl group, alternatively, a xylyl group. Applicable alkylaryl group(s) for the mono- or di-hydrocarbylamines include a benzyl group. Exemplary non-limiting primary amines include, but are not limited to ethylamine, isopropylamine, cyclohexylamine, benzylamine, aniline, and naphthylamine. Exemplary non-limiting secondary amines, include but are not limited to, diethylamine, diisopropylamine, dicyclohexylamine, dibenzylamine, bis(trimethylsilyl)amine, morphorine, imidazole, indoline, indole, and the like. Amides that may be used to form the catalyst system include $C_0$ to $C_{20}$, $C_2$ to $C_{10}$, amides. The metal atom of the amides may be lithium, sodium, or potassium; alternatively, lithium; alternatively, sodium, or alternatively potassium. The amide portion of the amide may be any primary of secondary amine disclosed herein. Exemplary amide include, but are not limited to, lithium amide, sodium ethylamide, calcium diethylamide, lithium diisopropylamide, potassium benzylamide, sodium bis(trimethylsilyl)amide, and lithium indolide.

The pyrrole-containing compound, which may be utilized as the nitrogen-containing compound may be any pyrrole-containing compound, or pyrrolide, that will react with a chromium source to form a chromium pyrrolide complex. As used in this disclosure, the term "pyrrole-containing compound" refers to pyrrole ($C_5H_5N$), derivatives of pyrrole, substituted pyrrolides, as well as metal pyrrolide complexes. A "pyrrolide" is defined as any compound comprising a 5-membered, nitrogen-containing heterocyclic ring, pyrrole. Broadly, the pyrrole-containing compound may be pyrrole or any heteroleptic or homoleptic metal complex or salt containing a pyrrolide radical or ligand.

Generally, the pyrrole-containing compound may be a $C_4$ to $C_{20}$ pyrrole; or alternatively, a $C_4$ to $C_{10}$ pyrrole. In an embodiment, pyrrole-containing compound (also called the "pyrrole") may be a substituted pyrrole. In some embodiments the pyrrole may be a 2-substituted pyrrole; alternatively, a 3-substituted pyrrole; alternatively, a 2,3-disubtituted pyrrole; alternatively, a 2,4-disubstituted pyrrole; alternatively, a 2,5-didsubstituted pyrrole, alternatively, a 2,3,4-trisubstituted pyrrole; alternatively, a 2,3,5-trisubstituted pyrrole; or alternatively, a 2,3,4,5-tetrasubstituted pyrrole. Generally, the substituent of any multi-substituted pyrrole may be the same or different. In some, embodiments, the 2 and 5 substituents of any pyrrole having substituents at the 2 and 5 positions may be the same or different.

Each substituent of any substituted pyrrole described herein may be independently selected from a halide, a $C_1$ to $C_{16}$ organyl group or a $C_1$ to $C_{16}$ hydrocarbyl group; alternatively, a $C_1$ to $C_{16}$ organyl group; or alternatively, a $C_1$ to $C_{16}$ hydrocarbyl group. In an embodiment, each substituent of any substituted pyrrole described herein may be independently selected from a halide, a $C_1$ to $C_{12}$ organyl group or a $C_1$ to $C_{12}$ hydrocarbyl group; alternatively, a $C_1$ to $C_{12}$ organyl group; or alternatively, a $C_1$ to $C_{12}$ hydrocarbyl group. In some embodiments, each substituent of any substituted pyrrole described herein may be independently selected from a halide, a $C_1$ to $C_8$ organyl group or a $C_1$ to $C_8$ hydrocarbyl group; alternatively, a $C_1$ to $C_8$ organyl group; or alternatively, a $C_1$ to $C_8$ hydrocarbyl group. In other embodiments, each substituent of any substituted pyrrole described herein may be independently selected from a $C_1$ to $C_{16}$ alkyl group, a $C_6$ to $C_{16}$ aryl group, or a $C_7$ to $C_{16}$ alkyl aryl group; alternatively, a $C_1$ to $C_{16}$ alkyl groups; alternatively, a $C_6$ to $C_{16}$ aryl group; or alternatively, a $C_7$ to $C_{16}$ alkyl aryl group. In further embodiments, each substituent of any substituted pyrrole described herein may be independently selected from a $C_1$ to $C_{12}$ alkyl group, a $C_6$ to $C_{12}$ aryl group, or a $C_7$ to $C_{12}$ alkyl aryl group; alternatively, a $C_1$ to $C_{12}$ alkyl groups; alternatively, a $C_6$ to $C_{12}$ aryl group; or alternatively, a $C_7$ to $C_{12}$ alkyl aryl group. In yet another embodiment, each substituent of any substituted pyrrole described herein may be independently selected from a $C_1$ to $C_8$ alkyl group. In an embodiment, any substituent of a substituent pyrrole may be a halide.

In an embodiment, a halide substituent may be fluoride, chloride, bromide, or iodide; alternatively fluoride; alternatively, chloride; alternatively, bromide; or alternatively, iodide. In an embodiment, the organyl group may be an acyl group having the formula —$C(O)R^{1a}$ where $R^{1a}$ is a hydrocarbyl group, a hydrocarboxycarbonyl group having the formula —$C(O)OR^{2a}$ where $R^{2a}$ is a hydrocarbyl group, a carbamoyl group having the formula —$C(O)NH_2$, a N-hydrocarbamoyl group having the formula —$C(O)NR^{3a}H$ where $R^{3a}$ is a hydrocarbyl group, or a N,N-dihydrocarbylcarbamoyl group having the formula —$C(O)NR^{3a}R^{4a}$ where $R^{3a}$ and $R^{3a}$ independently are hydrocarbyl groups; alternatively, an acyl group having the formula —$C(O)R^{1a}$ where $R^{1a}$ is a hydrocarbyl group; alternatively, a hydrocarboxycarbonyl group having the formula —$C(O)OR^{2a}$ where $R^{2a}$ is a hydrocarbyl group; alternatively, a carbamoyl group having the formula —$C(O)NH_2$; alternatively, a N-hydrocarbamoyl group having the formula —$C(O)NR^{2a}H$ where $R^{3a}$ is a hydrocarbyl group; or alternatively, a N,N-dihydrocarbylcarbamoyl group having the formula —$C(O)NR^{3a}R^{4a}$ where $R^{2a}$ and $R^{3a}$ independently are hydrocarbyl groups. Generally, $R^{1a}$, $R^{2a}$, $R^{3a}$, or $R^{4a}$ of the acyl group, hydrocarboxylcarbonyl, group, N-hydrocarbamoyl group, or N,N-dihydrocarbylcarbamoyl group may be independently selected from the same hydrocarbyl groups which may be substituents of the pyrrole without limitation.

Each alkyl group which may be utilized as substituents for any substituted pyrrole described herein or as $R^{1a}$, $R^{2a}$, $R^{3a}$, or $R^{4a}$ of the acyl group, hydrocarboxylcarbonyl, group, N-hydrocarbamoyl group, or N,N-dihydrocarbylcarbamoyl group may be independently selected from a methyl group, an ethyl group, a propyl group, a butyl group, a pentyl group, a hexyl group, a heptyl group, an octyl group, a nonyl group, a decyl group, an undecyl group, or dodecyl group; alternatively, a methyl group, an ethyl group, a propyl group, a butyl group, a pentyl group, a hexyl group, a heptyl group, or an octyl group. In an embodiment, Each alkyl group which may be utilized as substituents for any substituted pyrrole described herein or as $R^{1a}$, $R^{2a}$, $R^{3a}$, or $R^{4a}$ of the acyl group, hydrocarboxylcarbonyl, group, N-hydrocarbamoyl group, or N,N-dihydrocarbylcarbamoyl group may be independently selected from a methyl group, an ethyl group, an n-propyl group, an isopropyl group, an n-butyl group, an iso-butyl group, a sec-butyl group, a tert-butyl group, an pentyl group, or a neopentyl group; alternatively, a methyl group; alternatively, an ethyl group; alternatively, an n-propyl group; alternatively, an isopropyl group; alternatively, an n-butyl group; alternatively, an iso-butyl group; alternatively, a sec-butyl group; alternatively, a tert-butyl group; alternatively, an pentyl group; or alternatively, a neopentyl group. Each aryl group which may be utilized as substituents for any substituted pyrrole described herein or as $R^{1a}$, $R^{2a}$, $R^{3a}$, or $R^{4a}$ of the acyl group, hydrocarboxylcarbonyl, group, N-hydrocarbamoyl group, or N,N-dihydrocarbylcarbamoyl group may be independently selected from a phenyl group, a tolyl group, or a xylyl group; alternatively, a tolyl group; or alternatively, a xylyl group. Each alkylaryl group which may be utilized as substituents for any substituted pyrrole described herein or as $R^{1a}$, $R^{2a}$, $R^{3a}$, or $R^{4a}$ of the acyl group, hydrocarboxylcarbonyl, group, N-hydrocarbamoyl group, or N,N-dihydrocarbylcarbamoyl group may be a benzyl group.

Exemplary pyrrole-containing compounds that may be used as the nitrogen compound in the oligomerization catalyst system include, but are not limited to pyrrole-2-carboxylic acid, 2-acetylpyrrole, pyrrole-2-carboxaldehyde, tetrahydroindole, 2,5-dimethylpyrrole, 2,4-dimethyl-3-ethylpyrrole, 3-acetyl-2,4-dimethylpyrrole, ethyl-2,4-dimethyl-5-(ethoxycarbonyl)-3-pyrrole-proprionate, ethyl-3,5-dimethyl-2-pyrrolecarboxylate, pyrrole, 2,5-dimethylpyrrole, 2,5-diethyl pyrrole, 3,4-dimethylpyrrole, 3,4-dichloropyrrole, 2,3,4,5-tetrachloropyrrole, 2-acetylpyrrole, pyrazole, pyrrolidine, and dipyrrolomethane, and mixtures thereof, among others. In an embodiment, the pyrrole-containing compound may be 2,5-dimethylpyrrole; or alternatively, 2,5-diethylpyrrole. The selection of the pyrrole-containing compound may be made on the basis of cost, availability, and activity. For example, pyrrole or 2,5-dimethylpyrrole, or alternatively, 2,5-diethyl pyrrole may be used as the nitrogen compound, as these compounds may have higher availability or provide higher activity than other nitrogen compounds listed herein. Certain of these pyrroles are described in U.S. patent application Ser. No. 12/609,272, entitled OLIGOMERIZATION CATALYST SYSTEM AND PROCESS FOR OLIGOMERIZING OLEFINS, and filed concurrently with this application on Oct. 30, 2009, which is hereby incorporated by reference in its entirety.

The metal alkyl may be any heteroleptic or homoleptic metal alkyl compound. The metal of the metal alkyl may comprise a group 1, 2, 11, 12, 13, or 14 metal; or alternatively a group 13 or 14 metal; or alternatively, a group 13 metal. In some embodiments, the metal alkyl may comprise a lithium alkyl, sodium alkyl, magnesium alkyl, boron alkyl, a zinc alkyl, or an aluminum alkyl. Exemplary metal alkyls include, but are not limited to, n-butyl lithium, sec-butyl lithium, tert-butyl lithium, diethyl magnesium, or diethyl zinc. In an embodiment the metal alkyl may be an aluminum alkyl.

In an aspect, the metal alkyl may be a metal alkyl halide. Metal alkyl halides are described herein and may be utilized as the metal alkyl component of the oligomerization catalyst system. The halide portion of the metal alkyl halide maybe chloride; alternatively bromide; or alternatively iodide.

In an aspect, the metal alkyl may be a non-hydrolyzed alkylaluminum compound. In an embodiment, the non-hydrolyzed alkyl aluminum compound may be a Trialkylalumium compound, an alkyl aluminum halide, or and alkyl aluminum alkoxide. Generally, each alkyl group of any metal alkyl described herein (e.g. alkyl aluminum compound or alkylaluminum halide, among others), if there is more than one, may independently be a $C_1$ to $C_{20}$ alkyl group; alternatively, a $C_1$ to $C_{10}$ alkyl group; or alternatively, a $C_1$ to $C_6$ alkyl group. In an embodiment the alkyl group(s) may independently be a methyl group, an ethyl group, a propyl group, a butyl group, a pentyl group, a hexyl group, a heptyl group, or an octyl group; alternatively, a methyl group, a ethyl group, a butyl group, a hexyl group, or an octyl group. In some embodiments, the alkyl group may independently be a methyl group, an ethyl group, an n-propyl group, an n-butyl group, an iso-butyl group, a n-hexyl group, or an n-octyl group; alternatively, a methyl group, an ethyl group, a n-butyl group, or an iso-butyl group; alternatively, a methyl group; alternatively, an ethyl group; alternatively, an n-propyl group; alternatively, an n-butyl group; alternatively, an iso-butyl group; alternatively, a n-hexyl group; or alternatively, an n-octyl group.

In an aspect the metal alkyl may comprise or can be selected from a trialkyl aluminum compound, a dialkyl aluminum halide compound, an alkyl aluminum dihalide compound, a dialkyl aluminum hydride compound, an alkyl aluminum dihydride compound, a dialkyl aluminum hydrocarbyloxide compound, an alkyl aluminum dihydrocarbyloxide compound, an alkyl aluminum sesquihalide compound, an alkyl aluminum sesquihydrocarbyloxide compound, or any combination thereof. Applicable alkyl groups and halide for the metal alkyl, metal alkyl halides, and/or metal alkyl hydrocarbyloxides are described herein and may be utilized to further describe the suitable metal alkyls.

Exemplary trialkyl aluminum compounds may include but are not limited to, trimethyl aluminum, triethyl aluminum, tripropyl aluminum, tri-n-butyl aluminum, or tri-isobutyl aluminum, or mixtures thereof. Exemplary alkyl aluminum halide compounds may include, but are not limited to, diethylaluminum chloride, diethylaluminum bromide, ethylaluminum dichloride, ethylaluminum sesquichloride, and mixtures thereof. In an embodiment, the trialkyl aluminum compound may be triethyl aluminum.

In an aspect the metal alkyl compound may be a mixture of a trialkyl aluminum compound and an alkyl aluminum halide. Generally, the trialkyl aluminum compound of the mixture may be any trialkyl aluminum compound described herein. The alkyl aluminum halide compound of the mixture may be any alkyl aluminum compound described herein. In some embodiments, the mixture of the trialkyl aluminum compound and the alkyl aluminum halide may comprise, or consist essentially of, triethyl aluminum and diethyl aluminum chloride, triethyl aluminum and ethyl aluminum dichloride, or triethyl aluminum and ethyl aluminum sesquichloride. In an embodiment, the metal alkyl component of the oligomerization catalyst system may be a mixture of triethyl aluminum and diethyl aluminum chloride.

In another aspect and in any embodiments, specific examples of metal alkyls that are useful in this disclosure can comprise or can include, but are not limited to trimethylaluminum (TMA), triethylaluminum (TEA), ethylaluminum dichloride, tripropylaluminum, diethylaluminum ethoxide, tributylaluminum, disobutylaluminum hydride, triisobutylaluminum, diethylaluminum chloride (DEAC), and combinations thereof. In other aspects, and in any embodiments, specific examples of metal alkyls that are useful in this disclosure can comprise or can include, but are not limited to triethylaluminum (TEA) or diethylaluminum chloride (DEAC).

While not wishing to be bound by theory, it is believed that a halogen-containing compound can improve the product purity and selectivity of the oligomerization process. In some embodiments, the halogen-containing compound may be a chloride-containing compound, bromide-containing compound, or an iodide-containing compound. In an embodiment, the halogen-containing compound may be a chloride-containing compound.

In an aspect, the halogen-containing compound, regardless of whether it is a chloride-, bromide-, or iodide-containing compound, may be a metal halide, alkyl metal halide, or an organic halide. In an embodiment, the halogen-containing compound may be a metal chloride; alternatively, a metal bromide; or alternatively, a metal iodide. In an embodiment, the halogen-containing compound may be a metal alkyl chloride; alternatively, a metal alkyl bromide; or alternatively, a metal iodide. In an embodiment, the halogen-containing compound may be an organic chloride; alternatively, an organic bromide; or alternatively, an organic iodide.

In an aspect, the metal halide may comprise a group 3, 4, 5, 6 (except for chromium), 13, 14, or 15 metal. In some embodiments, the metal halide may be selected form the group consisting of scandium chloride, yttrium chloride, lanthanum chloride, titanium tetrachloride, zirconium tetrachloride, hafnium tetrachloride, boron trichloride, aluminum chloride, gallium chloride, silicon tetrachloride, trimethyl chlorosilane, germanium tetrachloride, tin tetrachloride, phosphorus trichloride, antimony trichloride, antimony pentachloride, bismuth trichloride, boron tribromide, aluminum tribromide, silicon tetrabromide, aluminum fluoride, molybdenum pentachloride, tungsten hexachloride, trityl hexachloroantimonate, or mixtures thereof In an aspect, the alkyl metal halide the metallic oligomerization catalyst further comprises a group 1, 2, 12, 13, or 14 metal. In an embodiment, the alkyl metal halide may be an alkyl aluminum halide, or an alkyl tin halide. In some embodiment, the alkyl aluminum halide may be an alkyl aluminum chloride; alternatively, an alkyl aluminum bromide; or alternatively, and alkyl aluminum iodide. In other embodiments, the alkyl tin halide may be an alkyl tin chloride; alternatively, an alkyl tin bromide; or alternatively, an alkyl tin iodide. In an embodiment, the alkyl metal halide may be an alkyl aluminum halide. In another embodiment, the alky metal halide may be an alkyl tin halide.

In an aspect the halide-containing compound may be an alkyl aluminum halide. In an embodiment the alkyl aluminum halide may be an alkyl aluminum chloride. Exemplary alkyl aluminum chlorides which may be utilized as the optional halide containing component of the oligomerization catalyst system include, but are not limited to, diethylaluminum chloride, diethylaluminum bromide, ethylaluminum dichloride, ethylaluminum sesquichloride, and mixtures thereof. In an embodiment, the alkyl aluminum chlorides which may be utilized as the optional halide-containing component of the oligomerization catalyst system may be diethyl aluminum chloride.

In an aspect, the organic halide may be a $C_1$ to $C_{15}$ organic halide; alternatively, a $C_1$ to $C_{10}$ organic halide; or alternatively, a $C_1$ to $C_8$ organic halide. In an embodiment, the organic halide may be selected from the group consisting of carbon tetrachloride, carbon tetrabromide, chloroform, bromoform, dichloromethane, dibromoethane, diiodomethane, bromomethane, iodomethane, dichloroethane, tetrachloroethane, trichloroacetone, hexachloroacetone, hexachlorocyclohexane, 1,3,5-trichlorobenzene, hexachlorobenzene, trityl chloride, benzyl chloride, benzyl bromide, benzyl iodide, chlorobenzene, bromobenzene, iodobenxene, hexafluorobenzene, or mixtures thereof.

In an aspect, the catalyst system has a molar ratio of metal in the metal precursor to metal in the metal alkyl ranging from 1:1 to 1:150; alternatively, 1:1 to 1:100; or alternatively, 1:9 to 1:21. In an embodiment, when the when the catalyst precursor is a chromium compound (e.g. a chromium(III) carboxylate precursor composition) and the metal alkyl is an alkylaluminum compound (e.g. triethylaluminum, diethylaluminum chlorid, or mixture thereof), catalyst system may have a molar ratio of chromium to aluminum ranging from 1:1 to 1:150; alternatively, 1:1 to 1:100; or alternatively, 1:9 to 1:21.

In an aspect, the catalyst system has a molar ratio of nitrogen of the nitrogen containing compound to metal of the metal precursor ranging from 1.0:1 to 4.0:1; alternatively from 1.5:1 to 3.7:1; alternatively from 1.5:1 to 2.5:1; alternatively from 2.0:1 to 3.7:1; alternatively from 2.5:1 to 3.5:1; or alternatively from 2.9:1 to 3.1:1. In an embodiment when the catalyst precursor is a chromium compound (e.g. a chromium (III) carboxylate precursor composition) and the nitrogen containing compound is a pyrrole (e.g. a 2,5-disubstituent pyrrole), the molar ratio of chromium to pyrrole nitrogen ranges from 1.0:1 to 4.0:1; alternatively from 1.5:1 to 3.7:1; alternatively from 1.5:1 to 2.5:1; alternatively from 2.0:1 to 3.7:1; alternatively from 2.5:1 to 3.5:1; or alternatively from 2.9:1 to 3.1:1.

Oligomer Formation

Figure 3:
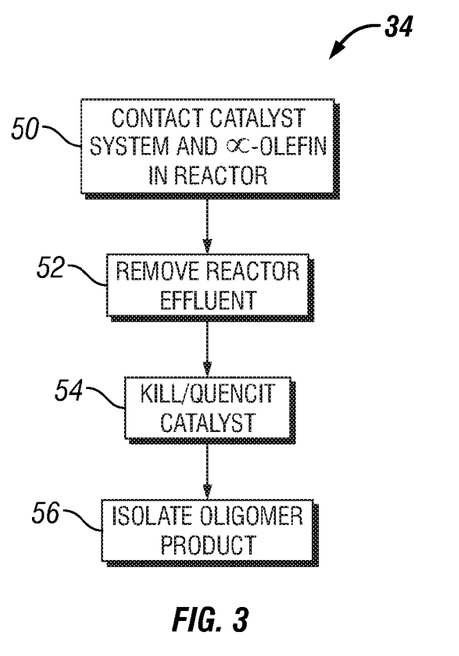
FIG. 3 is a block diagram of an oligomerization method in accordance with embodiments of the present techniques.

The catalyst system described herein may be used to form the oligomer (e.g., 1-hexene, 1-octene, etc.) by the exemplary method 34 depicted in FIG. 3. In the oligomerization method 34, a catalyst system is contacted with one or more alpha olefin (e.g., ethylene, butene, etc.) in a reactor (block 50). Other compounds, such as solvent, hydrogen, and so on, may be optionally added to the reactor. The catalyst system may be added as a complete catalyst system to the reactor, or components of the catalyst system may be added separately to the reactor. See, for example, the attached U.S. Pat. No. 7,384,886, which is hereby incorporated by reference in its entirety for all purposes.

Moreover, the catalyst system formation may be continuous or intermittent, depending on the type of reactor. For example, if a loop reactor is used, a continuous catalyst system (or catalyst system components) addition may be maintained as a product stream is removed. In contrast, in a batch reactor, a single catalyst system (or catalyst system components) may be made. In a batch reactor, the catalyst may be contacted with the aromatic compound to increase the stability of the catalyst system in the reactor prior to the addition of any other reactants.

The oligomerization reaction may be performed in different types of reactors, including a solution reactor, a slurry reactor, or a gas phase reactor, and so on. Furthermore, more than one reactor may be used, with the reactors being in sequence, in parallel, or in combinations thereof. In one embodiment, as discussed herein, a loop slurry reactor may be used. In the loop slurry reactor, the catalyst system and any insoluble reactants or products may be suspended by agitation in a circulated loop.

If employed, any number of aliphatic or aromatic solvents may be used as a diluent for the oligomerization reaction. Generally, the solvent will be stable with respect to the oligomerization process, e.g., having no double bonds that may be reacted during the oligomerization. Accordingly, the oligomerization solvent may generally be a stable aliphatic compound. The oligomerization solvent may be a $C_4$ to $C_{24}$ compound; alternatively, a $C_4$ to $C_{15}$ compound; or alternatively, a $C_4$ to $C_{10}$ aliphatic compound. Exemplary aliphatic compounds include but are not limited to isobutane, cyclohexane, methylcyclohexane, 1-hexene, and octane, among others. The choice of the oligomerization solvent may be made on the basis of convenience in processing. For example, isobutane may be chosen to be compatible with diluents used for the formation of polyolefins in a subsequent processing step. Since 1-hexene may be the reaction product of the oligomerization, it may be chosen as the oligomerization solvent to decrease the need for separation. Further, cyclohexane or methylcyclohexane may be chosen to solubilize the products made during the oligomerization. In an embodiment, the oligomerization solvent may be cyclohexane. Other diluents that may be available on site may also be used for the process.

The oligomer or product alpha olefin of the present techniques may be a trimer formed from three monomer units, i.e., the oligomerization described herein includes a trimerization. Olefins that may be used in the trimerization process may be self-reacted, i.e., trimerized, to give useful products. For example, the trimerization of ethylene may yield 1-hexene and the trimerization of 1,3-butadiene may yield 1,5-cyclooctadiene. Other olefinic compounds may be reacted with different olefinic compounds to give useful products. For example, the co-trimerization of ethylene and hexene which may result in decenes, tetradecenes, or a mixture thereof. In other examples, co-trimerization of ethylene and 1-butene may result in octenes, and co-trimerization of 1-decene and ethylene may result in tetradecenes, dodecenes, or a mixture of both. As noted herein, the number of double bonds in the combination of three ethylene units is reduced by two, to one double bond in 1-hexene. In another example, the number of olefin bonds in the combination of two 1,3-butadiene units is reduced by two, to two olefin bonds in 1,5-cyclooctadiene.

Olefinic compounds that may be used in a trimerization reaction may generally be $C_2$ to $C_{30}$, $C_2$ to $C_{16}$, or $C_2$ to $C_{10}$, olefinic compound. For example, mono-1-olefin compounds that may be used in the process include acyclic and cyclic olefins. In an embodiment the olefinic compound may be ethylene, propylene, 1-butene, 2-butene, isobutylene, 1-pentene, 2-pentene, 1-hexene, 2-hexene, 3-hexene, 1-heptene, 2-heptene, 3-heptene, the four normal octenes, the four normal nonenes, and mixtures of any two or more thereof. In some embodiments, the olefinic compound may be ethylene, propylene, 1-butene, 1-pentene, 1-hexene, 1-heptene, 1-octene, 1-nonene, 1-decene and mixtures of any two or more thereof; alternatively, ethylene; alternatively, propylene; alternatively, 1-butene; alternatively, 1-pentene; alternatively, 1-hexene; alternatively, 1-heptene; alternatively, 1-octene; alternatively, 1-nonene; or alternatively, 1-decene. Further, diolefin compounds may be used in the process, such as 1,3-butadiene, 1,4-pentadiene, and 1,5-hexadiene. In an embodiment, the olefinic compound may be ethylene.

The trimerization reaction may be performed at temperatures and pressures at which the catalyst system can trimerize the olefin reactants. Generally, the reaction is performed at temperatures between about 0° C. and about 250° C., between about 60° C. and about 200° C., or between about 80° C. and about 150° C. If the reaction temperature is too low, the catalyst may produce too much undesirable insoluble product, such as polymer. If the reaction temperature is too high, the catalyst system or the reaction products may decompose. The reaction may be performed at a pressure between about atmospheric and about 2500 psig, between about atmospheric and about 2000 psig, or between about 300 psig and about 1600 psig. Too low of a reaction pressure may result in low catalyst system activity. When the olefinic compound is ethylene, the reaction may be performed at an ethylene partial pressure ranging from 20 psi to 2500 psi; alternatively, from 100 psi to 2000; alternatively, from 200 psi to 1500 psi; or alternatively, from 300 psi to 1000 psi. Optionally, hydrogen may be added to the reactor to accelerate the reaction, increase catalyst system activity, and/or polymer reduction. When hydrogen is utilized, the hydrogen partial pressure may range from 2 psi to 100 psi; alternatively, 5 psi to 75 psi; or alternatively, 10 psi to 50 psi.

The products of the trimerization may then be removed from the reactor in an effluent stream, as indicated in block 52. As previously mentioned, a product stream may be continuously removed from the reactor, while a continuous addition of solvent, catalyst system (or catalyst system components) and reactants will generally keep the amount of material in the reactor the same. Active catalyst system in the reactor effluent may be killed (deactivated) and/or quenched with addition a kill/quench agent (e.g., an alcohol), as indicated by reference numeral 54. Lastly, the effluent may purified to isolate the oligomer or trimer product (block 56).

In an aspect, the reactor effluent is treated to deactivate the active catalyst system, and may further be treated to separate products, recycle the residual reactants, medium, and other components suitable for recycling, and dispose of any components that are not recycled. One example of methods of deactivating the catalyst system may be found in U.S. patent application Ser. No. 12/609,631, now U.S. Pat. No. 8,049,052, entitled SYSTEM AND METHOD FOR DEACTIVATING AND QUENCHING AN OLIGOMERIZATION CATALYST, concurrently filed with this application on Oct. 30, 2009, and hereby incorporated by reference in its entirety.

When the oligomerization or trimerization process is deemed to be complete, the reactor effluent stream comprising solvent, olefin product(s), catalyst system, and some polymer and/or oligomer, may be contacted with an alcohol to deactivate the active catalyst system. Any alcohol which is soluble in the reactor effluent stream can be used. As used herein, the term "alcohol" includes monoalcohols, diols, and polyols. The alcohol may be selected by its boiling point, molecular weight, or such that the alcohol will not azeotrope with the olefin monomer product. In some embodiments of the invention, the alcohol has a boiling point different from the olefin product in the reactor effluent stream. In an exemplary process, wherein the catalyst system is used to trimerize ethylene to 1-hexene, an alcohol with six or more carbon atoms per molecule may be used. In an embodiment the alcohol may be a $C_4$ to $C_{30}$, $C_4$ to $C_{20}$, or $C_4$ to $C_{12}$ alcohol. Such alcohols are easily removable from the 1-hexene olefin product. Exemplary alcohols include, but, are not limited, 1-hexanol, 2-hexanol, 3-hexanol, 2-ethyl-hexanol, 1-heptanol, 2-heptanol, 3-heptanol, 4-heptanol, 2-methyl-3-heptanol, 1-octanol, 2-octanol, 3-octanol, 4-octanol, 7-methyl-2-decanol, 1-decanol, 2-decanol, 3-decanol, 4-decanol, 5-decanol, 2-ethyl-1-decanol, and mixtures thereof. In an embodiment the alcohol may be 2-ethyl-1-hexanol.

Alternatively, a low-molecular-weight diol or polyol, for example ethylene glycol, can be used as a catalyst deactivation agent. Diols and polyols commonly have much higher boiling points than monoalcohols of comparable molecular weight, and thus can be separated more easily from 1-hexene.

The alcohol is added to the reactor effluent stream in an amount sufficient to quench and/or kill the catalyst system to inhibit, or halt: (1) production of undesirable solids, i.e., polymer; and/or (2) product purity degradation due to isomerization, in the product separation process.

After the catalyst system has been deactivated, olefin product(s), such as, for example, 1-hexene, can be removed. Any removal process can be used, including for example, distillation.

Figure 4:
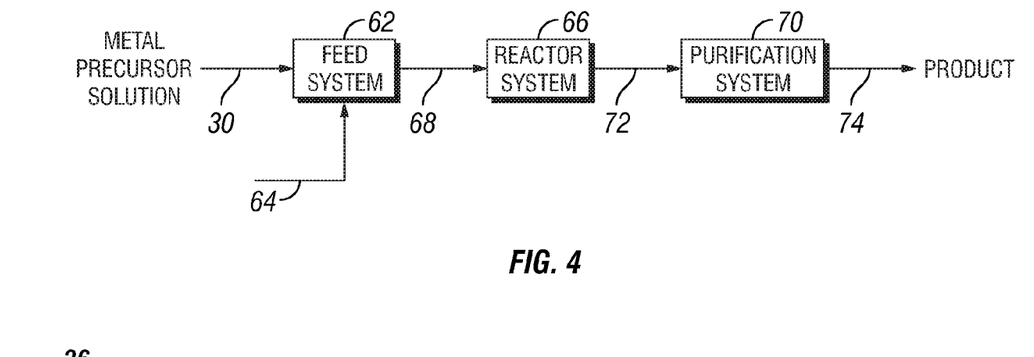
FIG. 4 is a block diagram of an oligomerization process in accordance with embodiments of the present techniques.

FIG. 4 is an exemplary oligomerization process 60. A metal precursor solution (metal precursor diluted in olefin solvent) is received at a feed system 62, as represented by arrow 30. Other feedstock materials 64 are also received into the feed system 62. In the feed system 62, the metal precursor solution is handled and combined with other compounds to form a catalyst system. The catalyst system, as well as other feed materials, may be added to an oligomerization reactor in a reactor system 66, as generally represented by arrow 68. A purification system 70 may receive a reactor effluent 72 to isolate the oligomer product 74. Again, for a discussion of applicable exemplary oligomerization processes, see the U.S. Patent Application Publication No. 2002/0182124 and attached U.S. Patent Application Publication No. 2004/0236163, which are hereby incorporated by reference in their entireties for all purposes.

Polyolefin Production Overview

In the production of polyolefin, the polymerization reactor, which polymerizes monomer into polyolefin, and the extruder, which converts the polyolefin into polyolefin pellets, is typically continuous. However, a variety of both continuous and batch systems may be employed throughout the polyolefin process. An exemplary nominal capacity for a typical polyolefin plant is about 900-1200 million pounds of polyolefin produced per year. Exemplary hourly design rates are approximately 85,000 to 150,000 pounds of polymerized polyolefin per hour, and 145,000 to 165,000 pounds of extruded polyolefin per hour. Future reactors may produce as much as 280,000 to 320,000 pounds of polymerized polyolefin per hour. A benefit of larger reactors may be lower unit costs per unit mass, such as pounds, of polyolefin, not only for capital investment to construct the reactor, but also for fixed costs and operating costs to maintain and operate the loop reactor, and so on. However, to provide feedstocks, such as the trimer comonomer discussed herein, at a sufficient rate to maintain these production rates may be difficult. The techniques for shipping catalyst disclosed herein may improve the efficiency, and lower the cost, of these processes.

Figure 5:
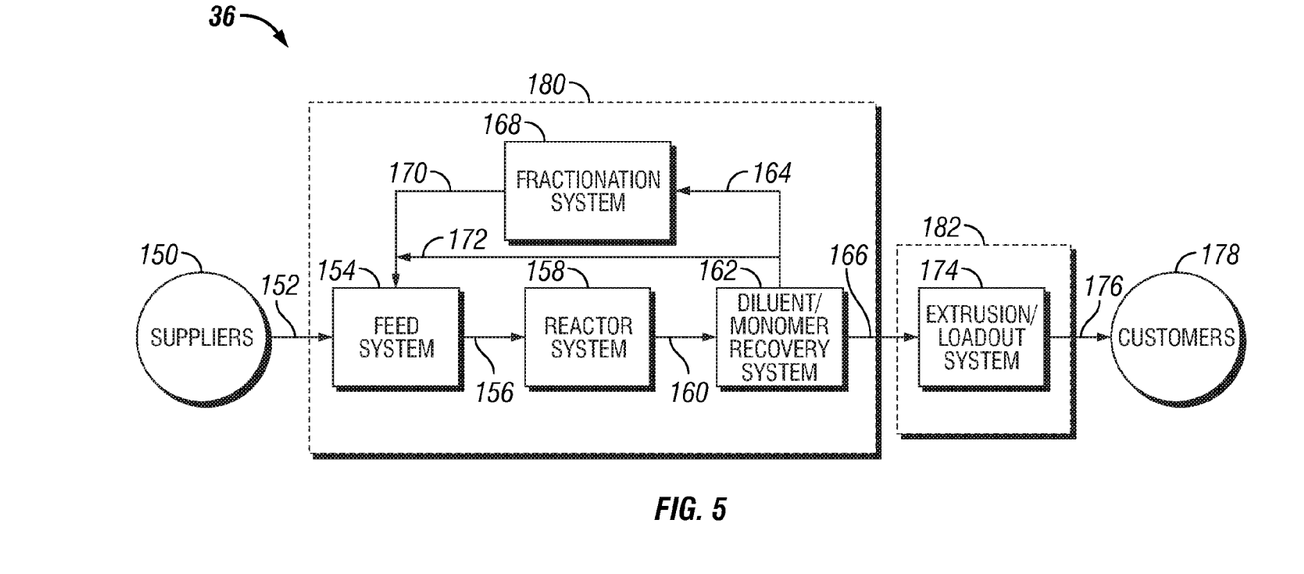
FIG. 5 is a block diagram of a polyolefin process in accordance with embodiments of the present techniques.

A manufacturing system 36 that may be used for producing polyolefins, such as polyethylene copolymer or polypropylene copolymer, for example, using the trimers discussed herein, is depicted in the block diagram in FIG. 5. Various suppliers 150 may provide reactor feedstocks 152 to the manufacturing system 36 via pipelines, trucks, cylinders, drums, and so forth. The suppliers 150 may include off-site and/or on-site facilities, such as, for example, olefin plants, refineries, catalyst plants, and the like, and may include the trimerization reactor process 36 of the present disclosure. Examples of possible feedstocks 152 include olefin monomers (such as ethylene and propylene) and comonomers (such the trimers discussed herein), diluents (such as propane, isobutane, n-hexane, and n-heptane), chain transfer agents (such as hydrogen), catalysts (such as Ziegler catalysts, Ziegler-Natta catalysts, chromium catalysts, and metallocene catalysts), co-catalysts (such as triethylaluminum alkyl, triethylboron, and methyl aluminoxane), and other additives. In the case of ethylene monomer, exemplary ethylene feedstock may be supplied via pipeline at approximately 800-1450 pounds per square inch (psi) at 45-65° F. Exemplary hydrogen feedstock may also be supplied via pipeline, but at approximately 900-1000 psi at 90-110° F. Of course, a variety of supply conditions may exist for ethylene, hydrogen, and other feedstocks 152.

Feed System

The suppliers 150 typically provide feedstocks 152 to a reactor feed system 154, where the feedstocks 152 may be stored, such as in monomer storage and feed tanks, diluent vessels, catalyst tanks, co-catalyst cylinders and tanks, and so forth. In the feed system 154, the feedstocks 152 may be treated or processed prior to their introduction as feed 156 into the polymerization reactors. For example, feedstocks 152, such as monomer, comonomer, and diluent, may be sent through treatment beds (such as molecular sieves, alumina, etc.) to remove catalyst poisons. Such catalyst poisons may include, for example, water, oxygen, carbon monoxide, carbon dioxide, and organic compounds containing sulfur, oxygen, or halogens. The olefin monomer and comonomers may be liquid, gaseous, or a supercritical fluid, depending on the type of reactor being fed. Also, it should be noted that typically only a relatively small amount of fresh make-up diluent as feedstock 152 is utilized, with a majority of the diluent fed to the polymerization reactor recovered from the reactor effluent.

The feed system 154 may prepare or condition other feedstocks 152, such as catalysts, for addition to the polymerization reactors. For example, a catalyst may be activated and then mixed with diluent or mineral oil in catalyst preparation tanks for subsequent delivery to the polymerization reactor. Further, the feed system 154 typically provides for metering and controlling the addition rate of the feedstocks 152 into the polymerization reactor to maintain the desired reactor stability to achieve the desired polyolefin properties or production rate. For example, a flow meter may be used to measure the flow of ethylene to the reactor. Flow meters that may be used include orifice meters or mass flow meters (such as Coriolis meters available from MicroMotion, Inc. of Boulder, Colo.).

During operation, the feed system 154 may also store, treat, and meter recovered reactor effluent for recycle to the reactor. Indeed, operations in the feed system 154 generally receive both feedstock 152 and recovered reactor effluent streams. In total, the feedstocks 152 and recovered reactor effluent are processed in the feed system 154 and fed as feed streams 156 to the reactor system 158.

Reactor System

The reactor system 158 may include one or more reactor vessels, such as liquid-phase or gas-phase reactors, or a combination of liquid and gas-phase reactors. If multiple reactors make up the reactor system 158, the reactors may be arranged in series, in parallel, or in any other suitable combination or configuration. One of ordinary skill in the art will recognize that the reactors may be operated at different conditions to make end products that are a combination of polymers from the different reactors and thus produce new or optimized end product properties. In the polymerization reactor vessels, one or more olefin monomers are polymerized to form a product including polymer particulates, typically called fluff or granules. The fluff may possess one or more melt, physical, rheological, and/or mechanical properties of interest, such as density, melt index (MI), melt flow rate (MFR), copolymer or comonomer content, modulus, and crystallinity. The reaction conditions, such as temperature, pressure, flow rate, mechanical agitation, product takeoff, component concentrations, polymer production rate, and so forth, may be selected to achieve the desired fluff properties.

In addition to the one or more olefin monomers, a catalyst that facilitates polymerization of the monomer is typically added to the reactor. The catalyst may be a particle suspended in the fluid medium within the reactor. In general, Ziegler catalysts, Ziegler-Natta catalysts, chrome-based catalysts, metallocenes, and other well-known polyolefin catalysts, as well as co-catalysts, may be used. An example of such a catalyst is a Ziegler catalyst containing tetravalent titanium on a silica support. Another example is a metallocene catalyst on a sulfated silica-alumina support.

Further, diluent may be fed into the reactor, typically a liquid-phase reactor. As previously mentioned, the diluent may be an inert hydrocarbon that is a liquid at reaction conditions, such as isobutane, propane, n-pentane, i-pentane, neopentane, n-hexane, cyclohexane, cyclopentane, methylcyclopentane, ethylcyclohexane, and the like. Again, a purpose of the diluent is generally to suspend the catalyst particles and polymer within the reactor (e.g., in the circulation of the polymer slurry in a loop reactor).

A motive device may be present within the reactor in the reactor system 158. For example, within a liquid-phase reactor, such as a loop slurry reactor, an impeller may create a turbulent mixing zone within the fluid medium. The impeller may be driven by a motor to propel the fluid medium as well as any catalyst, polyolefin fluff, or other solid particulates suspended within the fluid medium, through the closed loop of the reactor.

Diluent/Monomer Recovery, Treatment, and Recycle

The discharge 160 of the reactor system 158 may include the polymer fluff as well as non-polymer components, such as diluent, unreacted monomer and comonomer, and residual catalyst. The discharge 160 may be subsequently processed, such as by a diluent/monomer recovery system 162, to separate non-polymer components 164, such as diluent and unreacted monomer, from the polymer fluff 166. The diluent/monomer recovery system 162 may have a low-pressure recovery flash of the diluent/monomer with an associated recycle compression or may eliminate this process step using only a high pressure flash.

With or without the low pressure flash, the untreated recovered non-polymer components 164 may be further processed, such as by a fractionation system 168, to remove undesirable heavy and light components. Fractionated product streams 170 may then be returned to the reactor system 158 via the feed system 154. On the other hand, the non-polymer components 164 may be more directly recycled to the feed system 154 (as indicated by reference numeral 172), bypassing the fractionation system 168, and thus avoiding the energy consumption of the fractionation system 168. Indeed, in certain embodiments, up to 80-95% of the diluent discharged from the reactor bypasses the fractionation system in route to the polymerization reactor.

The polymer fluff 166 may be further processed within the diluent/monomer recovery system 162 and in an extrusion/loadout system 174 to prepare it for shipment, typically as pellets 176, to customers 178. Although not illustrated, polymer granules in the diluent/monomer recovery system 162, typically containing active residual catalyst, may be returned to the reactor system 158 for further polymerization, such as in a different type of reactor or under different reaction conditions. The polymerization and diluent recovery portions of the polyolefin manufacturing process 36 may be called the "wet" end 180 or "reaction" side of the process 36, and the extrusion/loadout 174 of the polyolefin process 36 may be called the "dry" end 182 or "finishing" side of the polyolefin process 36.

The polymer fluff 166 may be conveyed from the wet end 180 to the finishing side 182 by a blower or other electrical-mechanical force. Alternatively, the process pressure of the diluent/monomer recovery system 162 may be utilized to transport or convey the polymer fluff 166 from the wet end 180 to the finishing side 182. In this technique, the operation of the wet end 180 is more directly coupled to the finishing side 182. Such direct or "close" operative coupling may reduce the need for process residence time of the polymer fluff 166. Thus, the number of intermediate fluff storage vessels (e.g., silos) and associated blower/compressor systems and electrical consumption may be reduced.

Other Feed Streams

Recycle diluent (e.g., propane or isobutane) with entrained monomer may be returned from the diluent/monomer recovery system 162 (e.g., corresponding to stream 172 of FIG. 5) and sent to the polymerization reactor. The amount of entrained monomer may vary, depending on the polymerization efficiency. For example, the relatively low incorporation efficiency of 1-hexene from the trimerization of ethylene may increase the amount entrained in the recycle diluent stream. In the example of "direct" recycle to the reactor, the recycled diluent may be cooled and passed through a heavies' knockout pot, where heavy components are removed out of a bottom discharge and sent via a centrifugal pump, for example, as feed to the fractionation system 168. The overhead of the knockout pot may be further cooled in a heat exchanger and collected in a recycle diluent surge tank for feed to the reactor. Downstream, a centrifugal pump may deliver the diluent through recycle diluent treaters to a loop slurry reactor. It should be noted that a relatively small amount of fresh diluent (not illustrated) may be added in the fractionation system 168, for example, to make-up for diluent losses in the manufacturing process 36. Furthermore, comonomer (e.g., 1-hexene) may be added at various points in the recycle diluent circuit for addition to the reactor.

Extrusion/Loadout System

In the extrusion/loadout system 174, the polymer fluff 166 is typically extruded to produce polymer pellets 176 with the desired mechanical, physical, and melt characteristics. Extruder feed may include additives, such as UV inhibitors, flow enhancers, and peroxides, among others, which are added to the polymer fluff 166 to impart desired characteristics to the extruded polymer pellets 176. An extruder/pelletizer receives the extruder feed, including one or more fluff products 166 and whatever additives have been added. The extruder/pelletizer heats and melts the extruder feed which then may be extruded through a pelletizer die under pressure to form polyolefin pellets. Such pellets are typically cooled in a water system disposed at or near the discharge of the pelletizer. The pellets may be conveyed from the pelletizer to the loadout area using a blower, or may be directly carried by the pellet cooling water to the loadout area.

In general, the polyolefin polymer pellets 176 may then be transported to a product load-out area where the pellets 176 may be stored, blended with other pellets, and/or loaded into railcars, trucks, bags, and so forth, for distribution to customers 178. In the case of polyethylene, pellets 176 shipped to customers 178 may include linear low density polyethylene (LLDPE), medium density polyethylene (MDPE), high density polyethylene (HDPE), and enhanced polyethylene. The various types and grades of polyethylene pellets 176 may be marketed, for example, under the brand names Marlex® polyethylene or MarFlex™ polyethylene of Chevron Phillips Chemical Company, LP, of The Woodlands, Tex., USA.

Customers, Applications, and End-Uses

Polyolefin (e.g., polyethylene) pellets 176 may be used in the manufacturing of a variety of products, components, household items and other items, including adhesives (e.g., hot-melt adhesive applications), electrical wire and cable, agricultural films, shrink film, stretch film, food packaging films, flexible food packaging, milk containers, frozen-food packaging, trash and can liners, grocery bags, heavy-duty sacks, plastic bottles, safety equipment, coatings, toys and an array of containers and plastic products. Further, it should be emphasized that polyolefins other than polyethylene, such as polypropylene, may form such components and products via the processes discussed below.

Ultimately, the products and components formed from polyolefin (e.g., polyethylene) pellets 176 may be further processed and assembled for distribution and sale to the consumer. For example, a rotomolded sailboat may be outfitted for sale to a consumer, or a pipe line may be assembled and buried for natural gas distribution and sale. To form end-products or components, the pellets 176 are generally subjected to further processing, such as blow molding, injection molding, rotational molding, blown film, cast film, extrusion (e.g., sheet extrusion, pipe and corrugated extrusion, coating/lamination extrusion, etc.), and so on.

Blow molding is a process used for producing hollow plastic parts. The process typically employs blow molding equipment, such as reciprocating screw machines, accumulator head machines, and so on. The blow molding process may be tailored to meet the customer's needs, and to manufacture products ranging from the plastic milk bottles to the automotive fuel tanks mentioned herein. Similarly, in injection molding, products and components may be molded for a wide range of applications, including containers, food and chemical packaging, toys, automotive, crates, caps and closures, to name a few.

Extrusion processes may also be used. Polyethylene pipe, for example, may be extruded from polyethylene pellets and used in an assortment of applications due to its chemical resistance, relative ease of installation, durability and cost advantages, and the like. Indeed, plastic polyethylene piping has achieved significant use for water mains, gas distribution, storm and sanitary sewers, interior plumbing, electrical conduits, power and communications ducts, chilled water piping, and well casings, to name a few applications. In particular, high-density polyethylene (HDPE), which generally constitutes the largest volume of the polyolefin group of plastics used for pipe, is tough, abrasion-resistant and flexible (even at subfreezing temperatures). Furthermore, HDPE pipe may be made in size ranges from small diameter tubing up to pipe that is more than 8 feet in diameter. In general, polyethylene pellets may be supplied for the pressure piping markets, such as in natural gas distribution, and for the non-pressure piping markets, such as for conduit and corrugated piping.

Rotational molding is a high-temperature, low-pressure process used to form hollow parts through the application of heat to biaxially-rotated molds. Polyethylene resins generally applicable in this process are those resins that flow together in the absence of pressure when melted to form a bubble-free part, such as certain Marlex® HDPE and MDPE resins. Furthermore, the polyethylene resins suitable for rotational molding may exhibit desirable low-temperature impact strength, good load-bearing properties, and good ultraviolet (UV) stability. Accordingly, applications for rotationally-molded Marlex® resins include agricultural tanks, industrial chemical tanks, potable water storage tanks, industrial waste containers, recreational equipment, marine products, plus many more.

Sheet extrusion is a technique for making flat plastic sheets from a variety of polyethylene resins (pellets 176). The relatively thin gauge sheets are generally thermoformed into packaging applications such as drink cups, deli containers, produce trays, baby wipe containers and margarine tubs. Other markets for sheet extrusion of polyolefin include those that utilize relatively thicker sheets for industrial and recreational applications, such as truck bed liners, pallets, automotive dunnage, playground equipment, and boats. A third use for extruded sheet, for example, is in geomembranes, where flat-sheet polyethylene material is welded into large containment systems for mining applications and municipal waste disposal.

The blown film process is a relatively diverse conversion system used for polyethylene. The American Society for Testing and Materials (ASTM) defines films as less than 0.254 millimeter (10 mils) in thickness. However, the blown film process can produce materials as thick as 0.5 millimeter (20 mils), and higher. Furthermore, blow molding may be used in conjunction with monolayer and/or multilayer coextrusion technologies for producing numerous products, such as labeled bottles. Advantageous properties of the products produced by the blown film process may include clarity, strength, tearability, optical properties, and toughness, to name a few.

The cast film process may differ from the blown film process through the fast quench and virtual unidirectional orientation capabilities. These characteristics allow a cast film line, for example, to operate at higher production rates while producing beneficial optics. Applications in food and retail packaging take advantage of these strengths. Finally, polyolefin pellets may also be supplied for the extrusion coating and lamination industry.

Using either type of film extrusion, linear low density polyethylene, for example, may be extruded from polyethylene resin pellets and used in an assortment of applications due to its flexibility, chemical resistance, durability, processability, cost advantages, and the like. Such applications may include stretch films for palletizing materials, packaging for fresh cut fruits and vegetables, shrink wrap, and other product packaging. Films made from linear low density polyethylene have achieved significant success in unusual applications, such as geomembranes. A geomembrane may be used to isolate a storage pit, such as for a dump or sewer overflow pit, from the surrounding ground, and thus protect groundwater from contamination. Other applications may include garment bags, bakery films, industrial liners, and the like.

Example of Diluent Replacement in Production of the Metal Precursor Solution

Efficacy in Producing 1-Hexene

The effect of replacing ethyl benzene as a diluent for the metal precursor solution was tested using 1-decene (flash point=47° C.) and 1-dodecene (flash point=77° C.). Cyclohexane was used as a comparison and ethylbenzene was used as the control. To form the catalyst precursor solution, a paste of chromium (III) tris(2-ethylhexaonate) ($Cr(EH)_3$) composition was mixed in each solvent to a concentration of about 7.30 wt. % of chromium in the respective solvent.

The resulting chromium precursor solutions were used to make catalyst systems. The S1H catalyst was prepared in a drybox. 15.00 g of dry, degassed ethylbenzene were added to a dry 100 mL volumetric flask. To this flask was added 12.08 g neat triethylaluminum (TEA) and 9.27 g neat diethylaluminum chloride (DEAC). The contents were mixed and allowed to stand for 15 minutes. Then 2.74 g of 2,5-dimethylpyrrole was added. In another flask, 4.76 g chromium(III)2-ethylhexanoate paste (10.5% Cr) was dissolved in 2.38 g ethylbenzene. The chromium solution was added to the ethylbenzene/alkylaluminum solution in a volumetric flask. The volume was brought to 100 mL by adding ethylbenzene. The catalyst has a concentration of 5 mg Cr/mL.

The catalyst systems were then tested in ethylene trimerization reactions to determine the effects of the diluent on the trimerization reaction. The results obtained are presented in Table 1.

TABLE 1

Catalyst Properties using Different Cr(EH)3 Diluents[1]

| Diluent | C6 Selectivity | C6 Purity | Productivity (g C6/g) |
|---|---|---|---|
| 1-decene | 93.22 | 98.89 | 55,543 |
| 1-decene | 92.21 | 98.85 | 58,603 |
| 1-dodecene | 94.00 | 99.14 | 53,092 |
| 1-dodecene | 93.29 | 99.01 | 56,760 |
| cyclohexane | 93.87 | 99.07 | 49,252 |
| cyclohexane | 93.67 | 99.06 | 51,982 |
| ethylbenzen | 92.32 | 98.66 | 58,645 |
| ethylbenzen | 92.52 | 98.74 | 54,742 |

[1]Conditions: 1 L batch reactor; 115-117° C.; 50 psig $H_2$ added; 850 psig ethylene uptake on demand; 30 minute run time; 0.5 mL catalyst (5 mg Cr/mL); and 450 mL cyclohexane.

As seen in Table 1, the productivities of catalysts systems made with the $Cr(EH)_3$ diluents 1-decene, 1-dodecene and ethylbenzene were similar. However, cyclohexane, the only saturated hydrocarbon tested, produced a catalyst system with diminished productivity.

For the catalyst systems, 1-hexene selectivity and purity may generally track inversely with productivity, e.g., the higher the productivity, the lower the selectivity and purity. This trend can be seen when comparing data obtained from runs made with the same catalyst and catalyst solvent systems. However, there appear to be selectivity differences between metal precursor solvents that cannot be solely attributed to differing productivities.

As an example of the selectivity differences that may be present, 1-hexene selectivity improved by up to about 1% when 1-dodecene was used as the metal precursor solvent versus ethylbenzene as the metal precursor solvent for runs with similar productivities. This may be further illustrated by a comparison of the trimerization results for metal precursors diluted in 1-decene as compared with those diluted in 1-dodecene. Although the catalyst systems produced using the metal precursor diluted in 1-decene may be more active than the catalyst systems produced using the metal precursor diluted in the other solvent, the catalyst systems had lower selectivity than the catalyst systems produced using the metal precursor diluted in 1-dodecene or cyclohexane. Further, while the lower productivity of the catalyst systems produced using the metal precursor diluted with cyclohexane may have provided a correspondingly higher selectivity value, the productivity was poorer than for the catalyst systems produced using the metal precursor diluted in other solvents. The lower productivity for the catalyst systems produced using the metal precursor diluent cyclohexane may be due to some catalyst system degradation during activation, since olefinic and aromatic solvents may help to stabilize the catalyst.

A selectivity increase for the catalyst systems produced using the metal precursor diluent 1-dodecene may represent a substantial process improvement. For example, a 1% increase in selectivity towards the production of 1-hexene may provide a 15% reduction in longer chain byproducts. Accordingly, a commercial production unit using the catalyst systems produced using the metal precursor diluent 1-dodecene may have a lower operating cost and a higher 1-hexene production.

The improved selectivity may be seen more clearly in Table 2, which lists the percentage of the various carbon chain lengths in the products of the reactions in Table 1. The higher selectivity of the catalyst systems produced using the metal precursor diluent 1-dodecene may be due to a decrease in $C_{10}$ formation (as seen in Table 2). Formation of higher carbon numbers, such as $C_{12}$, $C_{14}$, $C_{16}$, etc., is also depressed due to the lower C10 production. Under these conditions, the amount of $C_{12}$ diluent represents less than 0.01% of the total ethylene converted and does not contribute to the product distribution differences. While it is unclear how the change in the metal precursor diluents might improve 1-hexene selectivity, and not to be limited to theory, it is believed that the weak coordinating ability of the alkene moiety may modify the catalyst activation step.

TABLE 2

Catalyst Carbon Number Selectivity

| Diluent | C6 | C8 | C10 | C12 | C14 | C16 | C18 |
|---|---|---|---|---|---|---|---|
| 1-decene | 93.22 | 0.47 | 5.64 | 0.17 | 0.25 | 0.14 | 0.12 |
| 1-decene | 92.21 | 0.47 | 6.56 | 0.19 | 0.28 | 0.16 | 0.14 |
| 1-dodecene | 94.00 | 0.49 | 4.81 | 0.21 | 0.17 | 0.17 | 0.16 |
| 1-dodecene | 93.29 | 0.53 | 5.34 | 0.25 | 0.24 | 0.20 | 0.17 |
| cyclohexane | 93.87 | 0.48 | 4.95 | 0.18 | 0.21 | 0.17 | 0.15 |
| cyclohexane | 93.67 | 0.51 | 5.04 | 0.21 | 0.23 | 0.19 | 0.16 |
| ethylbenzen | 92.32 | 0.49 | 6.34 | 0.21 | 0.33 | 0.18 | 0.15 |
| ethylbenzen | 92.52 | 0.45 | 6.26 | 0.18 | 0.31 | 0.15 | 0.13 |

$Cr(EH)_3$ Diluent Solution Properties

In addition to the efficacy of the catalyst system produced by using the chromium precursor diluted in ethyl benzene, cyclohexane, 1-decene and 1-dodecene for producing 1-hexene, or other trimers), the solution properties of the chromium precursor solution were tested. The solution properties affect the ability of the plant to handle the chromium precursor solution, e.g., higher viscosity solutions may not be pumped as easily. The viscosity of the chromium precursor solution may vary due to a number of factors including temperature, chromium concentration, free acid content, and diluent. Generally, the viscosity of the chromium precursor solution increases upon substituting 1-decene or 1-dodecene for ethylbenzene as the chromium precursor diluent, as seen in Table 3. It was also observed that 1-dodecene solutions have higher viscosities than 1-decene solutions, as shown in Table 3 and FIG. 6.

When the metal precursor solution prepared by the current method was diluted to 7.25 wt % Cr with 1-decene and 1-dodecene diluents, the viscosities obtained were generally too high to be operable in the plant at lower ambient temperatures, e.g., greater than about 300 centistokes. Accordingly, the solution was diluted to a concentration of 6.25 wt. % chromium in each of the solvents and the viscosity of this solution was tested with the results shown in Table 4.

TABLE 3

Temperature Dependent Viscosities (in centistokes) of 7.25 wt. % Cr Solutions[1,2]

| | Solution | | | Paste | | |
|---|---|---|---|---|---|---|
| Temp (° C.) | EB | 1-decene | 1-dodecene | EB | 1-decene | 1-dodecene |
| 4 | 233.3 | 454.0 | 698.4 | 674.8 | 1,334 | 2,301 |
| 20 | 86.6 | 158.6 | 243.7 | 233.0 | 465.0 | 760.5 |
| 40 | 31.1 | 53.7 | 77.7 | 64.9 | 139.2 | 215.1 |

Figure 6:
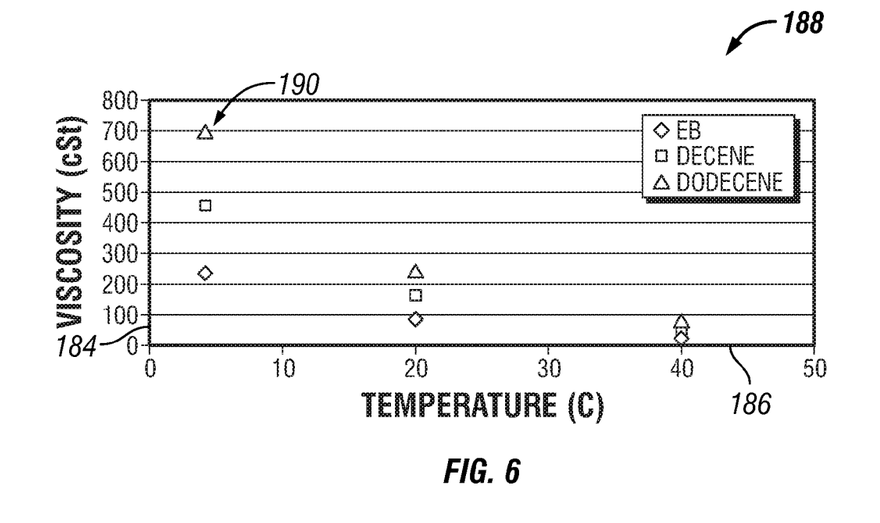
FIG. 6 is a chart comparing the relationship between temperature and viscosity for a 7.25 wt % solution of chromium (III) tris(2-ethylhexanoate) metal precursor in three solvents in accordance with embodiments of the present techniques.

[1]Solutions are diluted to 7.25 wt. % of chromium in the respective solvent.
[2]Data graphically graphically represented in FIG. 6.

TABLE 4

Temperature Dependent Viscosities (in centistokes) of 6.30 wt. % Cr Solutions[1,2]

| Temp (° C.) | EB | 1-decene | 1-dodecene |
|---|---|---|---|
| 4 | 80.6 | 160.2 | 282.8 |
| 20 | 28.3 | 61.4 | 105.9 |
| 40 | 31.2 | 22.5 | 36.4 |

Figure 7:
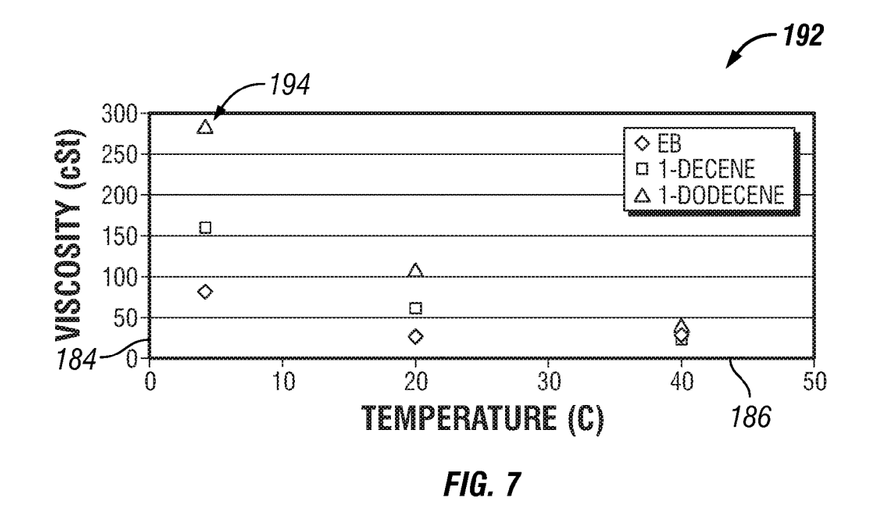
FIG. 7 is a chart showing the relationship between temperature and viscosity for a 6.30 wt % solution of chromium (III) tris(2-ethylhexanoate) metal precursor in various solvents in accordance with embodiments of the present techniques.

[1]Data graphically represented in FIG. 7.
[2]Using forming metal precursor paste.

The results of the viscosity determinations using the current method of forming the metal precursor solution, as presented in Tables 3 and 4, are graphically illustrated in FIGS. 6 and 7. In both of these figures, the viscosity (in centistokes, cSt) is plotted on the y-axis 184 and the temperature (in ° C.) is plotted on the x-axis 186. In both cases, the use of 1-dodecene as a solvent results in the highest viscosity, while the use of ethylbenzene (EB) results in the lowest viscosity. In FIG. 6, the chart 188 indicates that the maximum viscosity 190 obtained for a 7.30 wt % solution of chromium in 1-dodecene at a temperature of 4° C. is about 700 cSt. A solution of this viscosity may generally be difficult to pump through a pipeline between vessels, and thus would be difficult to handle in a plant. In contrast, as seen in chart 192 of FIG. 7, the highest viscosity 194 obtained for 6.30 wt. % chromium in 1-dodecene is less than about 300 cSt, resulting in a solution that would be easier to handle in a plant.

While the techniques disclosed above may be susceptible to various modifications and alternative forms, specific embodiments have been shown by way of example in the drawings. However, it should be understood that the techniques are not intended to be limited to the particular forms disclosed. Rather, the techniques encompass all modifications, equivalents and alternatives falling within the spirit and scope of the techniques as defined by the following appended claims.

What is claimed is:

1. A composition comprising:
    a) a chromium catalyst precursor, and
    b) about 10% to about 95% by weight of an olefinic diluent having between 6 and 18 carbon atoms, wherein the composition does not comprise a metal alkyl compound.

2. The composition of claim 1, wherein the composition comprises a nitrogen containing compound.

3. The composition of claim 1, wherein the composition comprises from about 18% to about 80% by weight of the olefinic diluent.

4. The composition of claim 1, wherein the composition comprises from about 25% to about 55% by weight of the olefinic diluent.

5. The composition of claim 1, wherein the chromium catalyst precursor is a chromium (II) or chromium (III) organometallic compound.

6. The composition of claim 1, wherein the chromium catalyst precursor is a chromium (II) or chromium (III) acetonate or carboxylate.

7. The composition of claim 1, wherein the chromium catalyst precursor is a chromium (II) or chromium (III) carboxylate wherein each carboxylate is a $C_4$ to $C_{19}$ carboxylate.

8. The composition of claim 1, wherein the chromium catalyst precursor is chromium (III)2-ethylhexanoate.

9. The composition of claim 1, wherein the olefinic diluent is an alpha olefin.

10. The composition of claim 1, wherein the olefinic diluent is selected from the group consisting of 1-decene, 1-dodecene, 1-tetradecene, and mixtures thereof.

11. The composition of claim 1, wherein the olefinic diluent is 1-decene or 1-dodecene.

12. The composition of claim 1, wherein the chromium catalyst precursor is a chromium(III) carboxylate wherein each carboxylate is a $C_4$ to $C_{19}$ carboxylate, the olefinic diluent consists essentially of a $C_{10}$ to $C_{14}$ normal alpha olefin, and the composition comprises from 25% to 55% of the olefinic diluent.

13. An oligomerization catalyst system comprising the composition of claim 1.

14. An oligomerization catalyst system comprising the composition of claim 12.

15. A composition comprising: a) a chromium catalyst precursor;
    and b) an olefinic diluent having between 6 and 18 carbon atoms, wherein the weight ratio of diluent to the chromium atom in the precursor ranges from 13:1 to 44:1, and wherein the composition does not comprise a metal alkyl compound.

16. The composition of claim 15, wherein the composition comprises a nitrogen containing compound.

17. The composition of claim 15, wherein the weight ratio of the olefinic diluent to the chromium atom ranges from 16:1 to 28:1.

18. The composition of claim 15, wherein the chromium catalyst precursor is a chromium (II) or chromium (III) organometallic compound.

19. The composition of claim 15, wherein the chromium catalyst precursor is a chromium (II) or chromium (III) acetonate or carboxylate.

20. The composition of claim 15, wherein the chromium catalyst precursor is a chromium (II) or chromium (III) carboxylate wherein each carboxylate is a $C_4$ to $C_{19}$ carboxylate.

21. The composition of claim 15, wherein the chromium catalyst precursor is chromium (III) 2-ethylhexanoate.

22. The composition of claim 15, wherein the olefinic diluent is an alpha olefin.

23. The composition of claim 15, wherein the olefinic diluent is selected from the group consisting of 1-decene, 1-dodecene, 1-tetradecene, and mixtures thereof.

24. The composition of claim 15, wherein the olefinic diluent is 1-decene or 1-dodecene.

25. The composition of claim 15, wherein the chromium catalyst precursor is a chromium(III) carboxylate wherein each carboxylate is a $C_4$ to $C_{19}$ carboxylate, the olefinic diluent consists essentially of a $C_{10}$ to $C_{14}$ normal alpha olefin, and the weight ratio of the olefinic diluent to the chromium atom ranges from 16:1 to 28:1.

26. An oligomerization catalyst system comprising the composition of claim 15.

27. An oligomerization catalyst system comprising the composition of claim 25.

* * * * *